United States Patent
Janakiraman

(10) Patent No.: US 10,805,173 B1
(45) Date of Patent: Oct. 13, 2020

(54) METHODS AND SYSTEMS FOR DEVICE GROUPING WITH INTERACTIVE CLUSTERING USING HIERARCHICAL DISTANCE ACROSS PROTOCOLS

(71) Applicant: Hewlett Packard Enterprise Development LP, Houston, TX (US)

(72) Inventor: Ramsundar Janakiraman, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/374,728

(22) Filed: Apr. 3, 2019

(51) Int. Cl.
| G06F 15/16 | (2006.01) |
| H04L 12/24 | (2006.01) |
| H04L 12/26 | (2006.01) |
| H04L 29/08 | (2006.01) |
| H04L 29/12 | (2006.01) |

(52) U.S. Cl.
CPC ........ *H04L 41/147* (2013.01); *H04L 41/0893* (2013.01); *H04L 43/045* (2013.01); *H04L 61/1511* (2013.01); *H04L 67/02* (2013.01)

(58) Field of Classification Search
CPC ..................................................... H04L 67/16
USPC ......................................................... 709/230
See application file for complete search history.

(56) References Cited

U.S. PATENT DOCUMENTS

| 8,117,486 B2 | 2/2012 | Handley et al. |
| 10,305,758 B1 * | 5/2019 | Bhide .................. G06F 16/2477 |
| 10,354,201 B1 * | 7/2019 | Roy ....................... G06N 20/00 |
| 2005/0120105 A1 * | 6/2005 | Popescu .................. H04L 41/00 709/223 |

(Continued)

FOREIGN PATENT DOCUMENTS

| WO | WO-2014209566 | 12/2014 |
| WO | WO-2017083191 | 5/2017 |

OTHER PUBLICATIONS

Bhandari, S. et al., Cloud-Assisted Device Clustering for Lifetime Prolongation in Wireless IoT Networks, (Research Paper), Apr. 2017, 5 Pgs.

(Continued)

*Primary Examiner* — Hamza N Algibhah
(74) *Attorney, Agent, or Firm* — Sheppard Mullin Richter & Hampton LLP

(57) ABSTRACT

Systems and methods are provided for interactively clustering a plurality of devices within a communication network. Techniques can include collecting intent to access messages and service advertisement messages that are communicated to a plurality of devices within the communication network. The intent to access messages and service advertisement messages can be formatted in accordance with a discovery protocol. The collected messages are analyzed to identify services, attributes, and attribute values associated with the plurality of devices using text-based analysis. Distances separating each the plurality of devices according to an associated distance value, can be determined. Distance val- (Continued)

ues relate to a degree of similarity between each of the plurality of devices based on the identify services, attributes, and attribute values. Clusters of devices can be generated based on the determined distances. A visualization of the communication network including graphical representations of the generated clusters of devices can be provided.

20 Claims, 10 Drawing Sheets

(56) References Cited

U.S. PATENT DOCUMENTS

| | | | |
|---|---|---|---|
| 2010/0031156 A1 | 2/2010 | Doyle et al. | |
| 2012/0151561 A1* | 6/2012 | Kreiner | H04L 12/1845 726/4 |
| 2013/0262645 A1* | 10/2013 | Akchurin | G06F 9/5061 709/223 |
| 2016/0057020 A1* | 2/2016 | Halmstad | H04L 41/22 715/740 |
| 2016/0374107 A1* | 12/2016 | Das | H04W 72/121 |
| 2017/0004208 A1 | 1/2017 | Podder et al. | |
| 2017/0017635 A1 | 1/2017 | Leliwa et al. | |
| 2017/0091168 A1 | 3/2017 | Bellegarda et al. | |
| 2017/0262523 A1* | 9/2017 | Epstein | H04L 67/1095 |
| 2017/0279829 A1 | 9/2017 | Vasseur et al. | |
| 2017/0366607 A1* | 12/2017 | Juhlin | H04L 67/1068 |
| 2018/0004948 A1 | 1/2018 | Martin et al. | |
| 2018/0248902 A1 | 8/2018 | Dumitrescu et al. | |
| 2019/0180141 A1* | 6/2019 | Tiagi | G06K 9/6221 |
| 2019/0273510 A1* | 9/2019 | Elkind | G06N 20/00 |
| 2019/0370347 A1* | 12/2019 | Levy | G06F 16/355 |

OTHER PUBLICATIONS

Chen, J., Semantic Information Extraction for Improved Word Embeddings, (Research Paper), May 31-Jun. 5, 2015, Proceedings of NAACL-HLT 2015, P. p. 168-175.

Chung, S. et al., An Unobtrusive Interaction Interface for Multiple Co-located Mobile Devices, (Research Paper), Dec. 7, 2015, Published in: 2015 IEEE 11th International Conference on Wireless and Mobile Computing, Networking and Communications (WiMob), Retrieved Sep. 26, 2018, 3 Pgs.

Ghosh, S. et al., Neural Networks for Text Correction and Completion in Keyboard Decoding, (Research Paper), Sep. 19, 2017, 14 Pgs.

Lamba, H. et al., A Model-based Approach to Anomaly Detection in Software Architectures, (Research Paper), Retrieved Nov. 9, 2018, 10 Pgs.

Lopez, W. et al., Vector Representation of Internet Domain Names using a Word Embedding Technique, (Research Paper), 2017, 8 Pgs.

Ramachandran, A. et al., Monitoring Stealthy Network Conversations with Sampled Traffic, (Research Paper), Dec. 2006, 54 Pgs.

Rothe, S., AutoExtend: Combining Word Embeddings with Semantic Resources, (Research Paper), Mar. 13, 2017, 25 Pgs.

Time-Dependent Representation for Neural Event Sequence Prediction, (Research Paper), 2018, 11 Pgs.

Ververidis, C. et al., Service Discovery for Mobile Ad Hoc Networks: A Survey of Issues and Techniques, (Research Paper). Retrieved Nov. 16, 2018, 18 Pgs.

Vijayalakshmi, S. et al., Mining of Users' Access Behaviour for Frequent Sequential Pattern from Web Logs, (Research Paper), Aug. 2010, International Journal of Database Management Systems (IJDMS) vol. 2. No. 3.. Aug. 2010, 15 Pgs.

Butterworth et al., "Device Discovery with mDNS and DNS-SD", Apple Inc., Oct. 5, 2009, 16 pages.

DNS SRV (RFC 2782) Service Types, available online at <http://www.dns-sd.org/servicetypes.html>, 2003 to 2010, 36 pages.

Genism, "Top Modelling for Humans", available online at <https://webarchive.org/web/20190705220216/https://radimrehurek.com/gensim/>, Jul. 5, 2019, 2 pages.

Mikolov et al., "Distributed Representations of Words and Phrases and their Compositionality", Oct. 16, 2013, pp. 1-9.

Pennington et al., "GloVe: Global Vectors for Word Representation", Oct. 2014, 12 pages.

Mikolov et al., "Efficient Estimation of Word Representations in Vector Space", Sep. 7, 2013, pp. 1-12.

\* cited by examiner

METHODS AND SYSTEMS FOR DEVICE GROUPING WITH INTERACTIVE CLUSTERING USING HIERARCHICAL DISTANCE ACROSS PROTOCOLS

DESCRIPTION OF RELATED ART

Clustering can be described as assigning a set of objects to groups, such that the objects within the same cluster are more similar (according to a property) to each other than to those objects in other clusters. The concept of creating, or otherwise identifying, clusters of nodes is applied in many fields, including computer networking, statistics, data analysis, and bioinformatics, for example. Particularly in the realm of computer networking, clustering nodes using the concept of "similarity" is often based on the physical topology of the network. Some network clustering algorithms capture the intuitive notion that nodes may be clustered with other nodes that are proximally located, such as clustering devices sharing a local area network (LAN). Accordingly, distance is a property that often governs the clustering of nodes in computer networking technologies.

There has been extensive work relating to distance measuring in the area of computer networks. Many existing distance measurement mechanisms are designed for obtaining distance related metrics that may be primarily dictated by the network topology, such as path delay, number of hops, and the like. As an example, some anycasting services employ a set of anycast resolvers that can measure the response times of replicated servers on behalf of clients to determine a distance therebetween (e.g., longer response time indicates larger distance between nodes). Thus, distance frequently serves as an anchor for determining "similar" nodes, and further for forming clusters of node that are present in a network. Nonetheless, it may be desirable to use clustering techniques driven by properties other than distance, that may be less tied to the physicality of the network.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
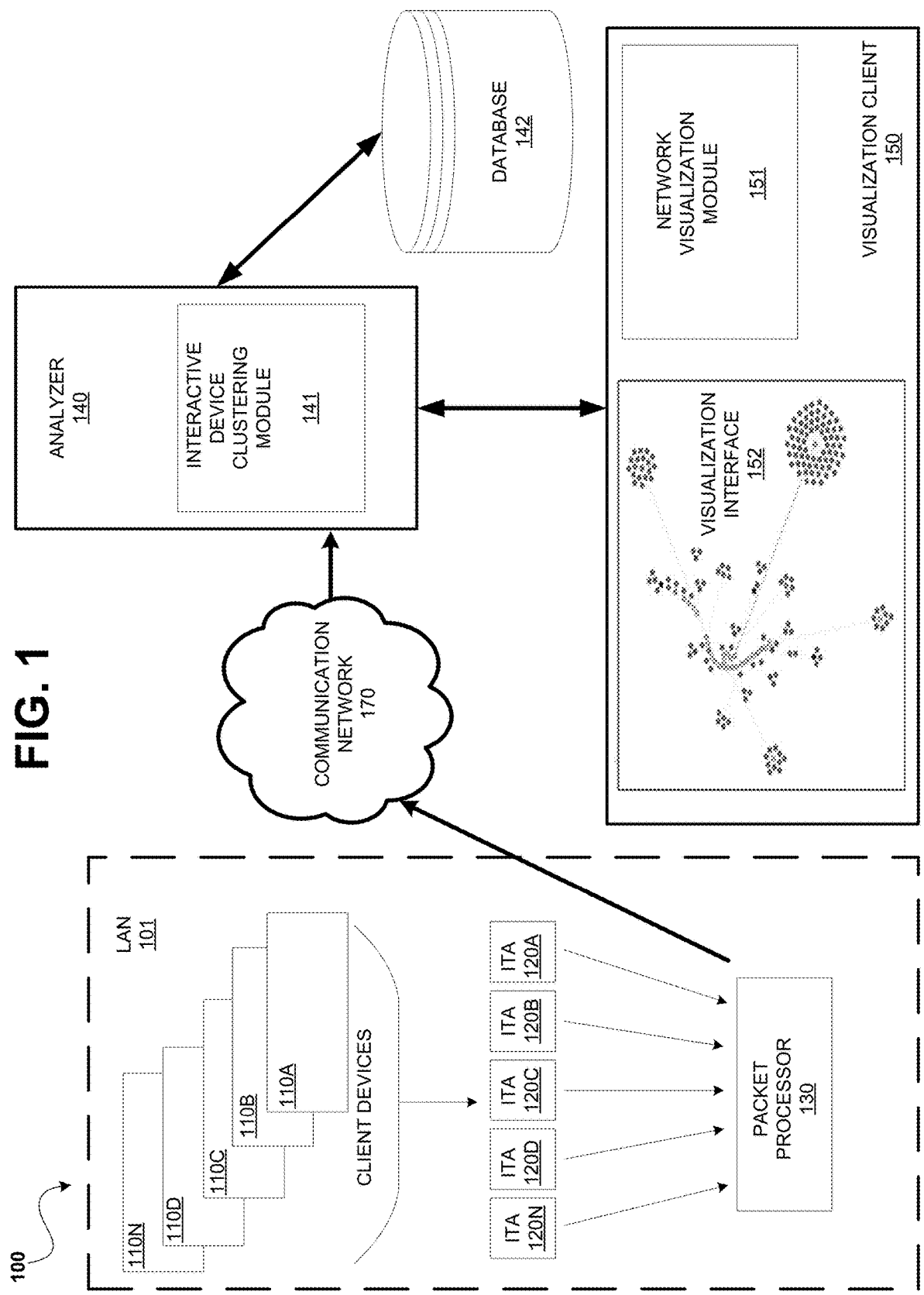
FIG. 1 illustrates an example of a system distributed across a communications network and including a network device implementing techniques for device grouping with interactive clustering using hierarchical distance, according to some embodiments.

The figures are not exhaustive and do not limit the present disclosure to the precise form disclosed.

DETAILED DESCRIPTION

Various embodiments described herein are directed to techniques and systems for device grouping with interactive clustering using hierarchical distance. As alluded to above, it may be desirable to use a clustering technique that is not driven solely by distance measurements. For example, an administrator may request network analytics that require devices of a common type, such as Apple Macintosh® (Mac®) computers, to be grouped in the same cluster. The clustering techniques disclosed herein can be configured to measure similarities (or dissimilarities) based on various properties, such as common services, common attributes, same resource type, and the like. Accordingly, the clustering techniques disclosed herein may provide advantages of flexibility and configurability over conventional network clustering mechanisms, which are often limited to analysis based on the physical topology and/or performance characteristics of the network. Furthermore, these properties can be retrieved from metadata associated with discovery protocol traffic. In other words, text-based analysis, such as natural language processing (NLP), can be used to analyze metadata and ultimately measure similarities between devices for clustering. In some embodiments, NLP techniques involve using dictionary encoding to remove biases that may be inherent in text-based distance approaches (e.g., length of the parameter names). For example, comparing a first parameter name set: Deviceid, pk, pn to a second parameter name set: Deviceid, pk, mn using the hierarchal distance algorithm may result in substantially close (e.g., two out of three) distance measurement. In some embodiments, the hierarchal distance algorithm allows a lexical analysis to be done with NLP to segment parameter names with a value. That is, analysis using the hierarchal distance approach can determine that two parameters (out the set containing three parameters), namely Deviceid and pk are common amongst both parameters sets. In contrast, a text-based measurement may calculate an closer distance due to the length of the text string for matching parameters, Deviceid (having eight characters) is longer than the length of the text string for matching parameters, pn vs. mn (having two characters). Thus, NLP analysis can establish a way to normalize text that is analyzed in the hierarchal distance algorithm. Because of this normalization, similarities are measured from the context of the text, for instance determining the same type of service is conveyed by text, rather than measuring the text strings themselves. The examples can achieve improved distance measurements and optimal clustering, by adapting the hierarchal distance algorithm to remove biases related to text.

Tools like language models, whose use is typically delegated to NLP-based applications, can be applied to discovery protocol traffic in a manner that ascertains similarities between network devices based on properties that are recognizable as text. Thus, the disclosed techniques may realize improved performance and efficiency over mechanisms that primarily use statistical (or mathematical) measurements, which may also require greater computational complexity.

Furthermore, the systems and techniques disclosed herein implement interactive clustering features. For example, the embodiments include a graphical user interface (GUI) that allows a user to interact with and configure aspects of the clustering techniques. According to the embodiments, user interactions can include configuring parameters related to a distance algorithm, which in turn impacts how clustering is performed. The interactive clustering aspects of the embodiments provide flexibility, such that a user can adapt clustering to be performed as deemed appropriate (or optimal) for the prevailing application (e.g., network environment, analytics, etc.). For example, a user can set a more restricting threshold for identifying devices as "similar" (e.g., decreasing the potential of finding similarities), or conversely a less restricting threshold for identifying devices as "similar" (e.g., increasing the potential of finding similarities). The configurable parameters may be adjusted based on multiple factors, such as a desire for a larger number of groups in a cluster (e.g., larger clusters), and the like. This approach is similar to looking at fractals where the self-similarity could be displayed at by zooming in and out. Distance can be approximated, as customized by a user, for number of groups.

Furthermore, the disclosed techniques involve a hierarchical distance approach. As a general description, the hierarchical distance approach determines a quantitative measurement of distance between nodes that is governed by a prioritization (e.g., hierarchical order) of characteristics that may be used to ascertain similarities between the nodes that is more qualitative. According to the embodiments, the hierarchical distance approach is the underlying concept which allows for a set of parameters (e.g., retrieved from discovery protocol traffic) to be used as a measure of similarity. As alluded to above, text-based analysis, such as NLP, can be utilized for measuring similarities between devices. The hierarchal distance approach adds a dimension to text-based analysis that extends beyond flat string distance algorithms. In the embodiments, multiple hierarchical levels can be assigned to properties that are recognizable as text, namely parameters of the discovery protocol traffic. Thus, each hierarchical level corresponds to both a parameter and a distance value (or a degree of similarity) relating to the particular parameter, which serves as a link for subsequently measuring distances based on these parameters. By employing text-based analysis in part, rather than relying fully on text, the hierarchical approach mitigates some drawbacks that are associated with implicit biases that can be implicit in text-based analysis. For example, a length of text string can largely impact the flat string distance algorithm. Text strings that are longer and may change frequently can indicate a greater distance. However, in some networking scenarios, the same device may communicate multiple pre-shared keys that have these characteristics. In this example, a fully text-based analysis using a flat string distance algorithm, for instance, may determine a large distance based on the pre-shared keys, even in the case of a complete similarity (e.g., same device). Thus, supplementing NPL techniques with the hierarchical distance approach in the manner of the disclosed embodiments, may optimize the trade-offs between limitations and advantages associated with text-based analysis.

The embodiments include mechanisms for passively collecting and analyzing discovery traffic. For example, the device grouping system disclosed herein leverages edge devices to listen to discovery traffic within the network, rather than employing mechanisms that inject additional traffic into the network that is solely for the purpose of analysis. Additionally, the system provides a minimal footprint by deploying fewer packet processing devices at strategic points in the network architecture (e.g., edge devices). As discussed herein, metadata from collected packets can be analyzed such that the information can be used to derive network analytics, namely the disclosed device grouping techniques. Discovery protocols consistent with the present disclosure may include a dynamic host configuration protocol (DHCP), a domain name service (DNS), a multicast DNS (mDNS) protocol, a link layer discovery (LLDP) protocol, a CISCO discovery protocol (CDP), and many more that are low in volume, but high in information content about the network. Discovery protocols include information that allows devices to operate in the network. Furthermore, the information included in a service advertisement message has analytical value. For instance, a mDNS message includes text that particularly corresponds to network and device characteristics, such as domain names, and services, that can be used as measure of similarity to perform clustering. Applying text-based analysis, namely NLP, to network traffic that has high informational content about the network and the devices thereon is the underlying concept for the distance algorithm.

FIG. 1 illustrates an example of a system 100 distributed across a communications network 110 and including a network device, shown as analyzer 140. The analyzer 140 can be configured for implementing techniques for device grouping with interactive clustering using hierarchical distance, according to some embodiments. In FIG. 1, an example network architecture including clients devices 110A-110N and packet processor 130 that can be proximately located, for instance within the same customer premises. Additionally, the client devices 110A-110N and the packet processor 130 can be communicatively connected to each other as part of a local area network (LAN) 101 (indicated by dashed lines). LAN 101 may be installed at the customer premises, such as in retail a store, a business (e.g., restaurants, shopping malls, and the like), a factory, an office building, and the like. In that regard, LAN 101 may include one or more of the clients devices 110A-110N.

Client devices 110A-110N may include a desktop, a laptop, or a mobile device such as a smart phone, a tablet, or any other portable computing device capable to communicate through LAN 101. In that regard, client device 110 may include several types of devices, which, even in the case that client device 110 is mobile, may be loosely or less often associated or co-located with a user. Another type of client device 110 may be more often or almost always associated or co-located with a user (e.g., a smart phone or another wearable device).

The network of FIG. 1 may include tap points, which can be points on the network to monitor, by a packet processor 130, network devices and data between the tap points and client devices 110A-110N. In some cases, tap points can be at a "network edge." Tap points can be described as locations that can have a visibility of local multicast based discovery that may not be routed beyond the network segment. Also, in some cases, tap points can be locations where a unique address can be obtained in all network layers, such as Media Access Control (MAC) and Internet Protocol (IP) in their respective layers. Network edges can provide predictable endpoints, e.g., tap points, from where to extract sample packets with a packet processor 130. Network edge can be a sensitive area where the pulse of the network, which is the LAN in FIG. 1, may be accurately registered and diagnosed. Alternatively, one or more tap points may be placed at any point in LAN 101 (e.g., not at the network edge). In some examples, tap points may be placed in the LAN 101 in order to provide visibility (e.g., to packet processor 130 via SPAN tunnels) of source IPs and/or discovery protocol traffic. As an example, a tap point can be placed between a router (not shown) and the LAN 101 to monitor discovery protocol traffic that are not routed beyond the router due to the nature of the discovery protocol or due to the broadcast discovery technique. In some examples, placing tap points between router and the LANs 101 may enable snapshotting of packets prior to any network address translation performed by router, thereby preserving the client IP and the frequency of resolution by each client. In some examples, such SPAN tunnels (e.g., SPAN tunnel 170) may connect router to tap points, such as when LAN 101 is switched. Network topology is highly dynamic (e.g., transient) on network edge 120; accordingly, placing the packet processor 130 at the edge enables packet processor 130 to determine how edge devices (e.g., APs and client devices 110A-110N) continue to connect, authenticate, and access to perform routine functions.

Accordingly, embodiments as disclosed herein include accurately determining the number and location of tap points in which to place one or more packet processor 130 to handle network volume. Some embodiments include the use of discovery tools, which operate within network edge and provide high-value, but low volume data traffic. Thus, in some embodiments, packet processor 130 uses discovery tools in addition to deep packet inspection metadata extraction operations to handle network analysis before the first hop protocols seen at the level of network edge 120. Access to this is obtained by either configuring a router to locally SPAN to a co-located or remote SPAN through a network to setup remotely but routable (e.g., into DNS server 100). This approach substantially reduces the bandwidth strain imposed in network resources by typical network analysis devices. In some embodiments, packet processor 130 may absorb less than 0.05% to 1% of the network traffic volume, opening up a wide bandwidth for other network resources and/or compute/storage resources. For instance, storage resources with the capacity to store a month of data collected via previous techniques may be able to store two years of data collected via the present techniques.

As seen in FIG. 1, the client devices 110A-110N can communicate various intent to access (ITA) messages 120A-120N. For purposes of discussion, ITA messages 120A-120N can be generally described as packets, records, or messages, that enable devices on a network to announce information related to its configurability (e.g., services and associated parameters) and accessibility in a manner that allows the devices to discover, connect, and communicate with each other on the network. In the example of FIG. 1, device discovery can be accomplished in accordance with a discovery protocol, namely mDNS. However, it should be understood that ITA messages 120A-120N can be messages that indicate an intent to access using various other discovery protocols, such as DTP, DNS, SSDP, and the like. An mDNS transaction can be indicative of intent to access, and thus are also referred to as ITA messages herein, and illustrated as ITA messages 120A-120N in FIG. 1. In some example, an mDNS transaction includes communicating mDNS records (shown in FIG. 2) that advertise types of services related to a particular device within a network, or that are more visible more widely.

As an example of a service discovery protocol using mDNS in FIG. 1, a client device 110A can communicate an mDNS record, such as an ITA message 120A, when the client device 110A becomes available to the network (e.g., after establishing connection to LAN 101). The ITA message 120a, including an mDNS record, can allow the client device 120a to advertise its capabilities (e.g., services) on LAN 101. In the case of a device advertising, an ITA messages can be referred to herein as service advertisement messages. The client device 110A can transmit the ITA message 120A to one or more other devices connected to the LAN 121 as part of a discovery process. Thus, the other client devices 110B-110N, upon receiving the ITA message 120A, can discover the client device 110A, its advertised services, and the associated parameters. Client devices 110B-110N that may be consumers of the advertised services can use the parameters indicated in the ITA 120A message to evaluate interoperability, connection methods, and other runtime operational compatibility to enable the services in the network. Alternatively, mDNS based service discovery can allow client device 110A to query the network to determine services that are available (e.g., services advertised by client devices 110B-110N). In some cases, mDNS can accomplish service discovery with zero configuration (also known as "zeroconf"). It should be appreciated that although only client device 110A is described in reference to FIG. 1, any of the other client devices 110B-110N on the LAN 101 are capable of communicating the ITA messages 120A-120N, for instance discovery messages in accordance with the mDNS protocol. Moreover, different mDNS records may have different configuration settings in terms of requirements and capabilities, access and privileges, based on the specification of LAN 121, and intended purpose.

The packet processor 130 situated at a tap point, as described above in detail, can intercept, or otherwise collect, ITA messages 120A-120N that may be communicated via LAN 101. Thus, the embodiments as disclosed herein require a comparatively small portion of the network traffic, namely the discovery traffic, to implement the device grouping to be further used in data analytics. In addition, some embodiments this capacity is enhanced by implementation at the network edge. In the illustrated example, the packet processor 130 can transmit the collected ITA messages 120A-120N, also referred to as discovery traffic, to an analyzer 140 which is a separate network device employed for analyzing the collected discovery traffic for analytics. In accordance with the embodiments, the analyzer 140 implements the device grouping and interactive clustering using distance features disclosed herein.

In some embodiments, packet processor 130 inspects the discovery traffic that may be initiated by client devices 110A-110N to discover the network resources with an application layer protocol (APP) or browser-based application installed on the client devices 110A-110N. The same application that discovers the network resources may initiate hypertext transfer protocol (HTTP), or HTTP-secure (HTTPS) or other application protocol to access the network resource from client devices 110A-110N. In some embodiments, packet processor 130 may use mDNS to resolve host names to IP addresses. Other protocols that can be used by packet processor 130 can include DNS. In the case of DNS, a DNS server can provide a DNS to the operating system of client devices 110A-110N, to map a network resource name configured in the APP to an IP address in network architecture. In some embodiments, a DNS server transmits resolution requests to client devices 110A-110N through DNS responses. SSDP tools may be used for resources co-located at the edge (e.g., plug and play devices, and the like). More specifically, some embodiments use the request part of discovery tools (e.g., protocols including memory devices storing commands and processors to execute the commands) for identification/discovery of client devices 110A-110N, which are typically multicast, thereby facilitating access to at least one copy. The host responses (or server/protocol proxy node's responses) carry equally critical info that provide the "network view," but may involve more network resources to track.

Network administrators monitor traffic to identify anomalies and deficiencies before major problems arise, e.g., loss of connectivity or network services for a client device in a wireless network (e.g., Wi-Fi and the like), or a local area network (LAN), or the spread of malware, data theft, security breaches, and the like. In embodiments as disclosed herein, an analyzer 130 can be configured with an interactive clustering module 141 that enables a network administrator to leverage discovery traffic for measuring similarities between devices on the LAN 101 in a hierarchical and configurable manner. Accordingly, as part of network analysis, the network administrator can generate a topological view of the network, namely LAN 101, showing devices on the network that are grouped together based on the characteristics of the devices (e.g., services and parameters) rather than conventional distance measurements, such as determining the a number of device groups statistically.

FIG. 1 shows the analyzer 140 as being a device that is remotely located from LAN 101 on customer premises (e.g., "cloud" deployment). In some embodiments, analyzer 140 can been located on LAN 101 rather than external to the network. As seen in FIG. 1, discovery traffic in the mDNS protocol that has been collected by packet processor 130 can be communicated, via communication network 170, to the analyzer. Communication network 170 can include, for example, a wide area network (WAN), the Internet, and the like. In some embodiments, analyzer 140 has full access to an associated database 142. Database 142 may store information related to discovery traffic and protocols for the analytics performed by the analyzer 140. In some examples, database 142 may be a distributed network accessible database (e.g., Hadoop-like distributed network accessible database) that can process workflows, discovery tools, and the like. In some embodiment, in addition to the interactive clustering and device grouping features, the analyzer 140 may perform other forms of network monitoring and analytics. For instance, analyzer 140 can apply machine-learning algorithms (e.g., neural networks, artificial intelligence, and the like) to build multiple user profiles and other network patterns (e.g., identify potentially harmful IP addresses or suspicious traffic behavior) that are stored in database 142. A user profile may include the type of client device 110A-110N used to log into LAN 101, the period of time that the connectivity lasted (latency), patterns of connectivity, and the like. In that regard, database 142 may also include DPI libraries to maintain flow states including handshake states between client devices 110A-110N and access points. In some embodiments, at least a portion of the analyzer 140 may be deployed within network edge of the LAN 101 (e.g., "on-premises" deployment).

In the embodiments, the interactive clustering module 141 includes executable instructions, computer components, or a combination of both that implement the specific functions of the interactive device clustering and device grouping aspects of the embodiments. For example, the interactive device clustering module 141 can include a graphical user interface (GUI) for receiving various user-configurable parameters entered by user, such as the network administrator associated with LAN 101. Therefore, the embodiments can provide an end user with the capability to adapt the hierarchical distance algorithm to function in a manner consistent with their intended analytics application. In some embodiments, a user can configure the hierarchical distance algorithm by assigning a respective value to each of the hierarchal levels of the algorithm. Consequently, by adjusting the values, the user can set which discovery parameters (that correspond to a particular hierarchical level) serve as a greater indicator of similarity by the algorithm. As an example, the network administrator can enter input place values that respectively correspond to a discovery parameter into the GUI of the interactive cluster module 141. In the case of mDNS protocol, a user can assign a higher place value to a particular discovery parameter, such as setting "services" to correspond with the thousandths place, while assigning a lower place value to another discovery parameter, such as setting "attributes" to the tenths place. Thus, the settings effectively adjust the clustering approach to utilize "service" as the discovery parameter having the highest weight in measuring similarity between devices. These abovementioned values used in configuring the hierarchal distance algorithm can range from place values (also referred to herein as decimal values), various orders of magnitude, or other mathematically related groupings as deemed appropriate. In some embodiments, the levels of hierarchy can be even broader than the protocol specific approach discussed above (levels restricted to parameters within a certain protocol). For instance, the interactive clustering module 141 can be configured to include a hierarchal level for different protocols (e.g., mDNS, DNS, SSDP, etc.), thereby allowing devices that communicate in a common protocol to be considered a property for similarity. In some cases, a hierarchical level for message type (e.g., discovery, advertisement) can be used. Details regarding the association between hierarchical levels and values, as applied by the hierarchal distance algorithm are discussed further in reference to FIG. 3C.

The interactive clustering module 141 can include other configurable parameters that are described in further detail herein, for example in reference to FIGS. 6A-6D. the some cases, this can signify that the network administrator is tuning a threshold a similarity such that the device grouping generates larger device groups (e.g., having a greater number of devices in each group). Furthermore, the interactive cluster module 141 can implement various NLP techniques that can be used in extracting text from the discovery traffic in the mDNS protocol, and then applying text-based analysis for measuring similarity between devices. Thereafter, the interactive cluster module 141 can use these degrees of similarity to calculate a distance measurement. For instance, interactive cluster module 141 can be configured to calculate a greater distance between two device on the network that have less similarities with each other. Conversely, a shorter distance between two devices on the network may be calculated by the interactive cluster module 141, when the devices are more similar to each other. Furthermore, a threshold of similarity, which governs the degree necessary for devices to qualify as similar (or dissimilar), is also a configurable parameter of the hierarchical distance algorithm. Accordingly, the interactive cluster module 141 provides the adjustability for a user to either restrict or broaden the requirement for a cluster, thereby configuring the distance algorithm to be predisposed for generating larger groups of devices (e.g., more devices in a group) or smaller groups of devices (e.g., less devices in a group). It should be appreciated that the interactive clustering and device grouping techniques disclosed can be adaptable for use with various other discovery protocols, and thus is not limited to applications using the mDNS protocol. Embodiments that are extended for use with other discovery protocols is discussed in greater detail in reference to FIG. 3C, for example.

Additionally, FIG. 1 shows a network visualization client 150 including a network visualization module 151. For example, the analyzer 140 can be a centralized computer, such as a server, having a processing capacity that is suitable to support the data processing and analysis necessary to implement the interactive clustering and device grouping features disclosed. The visualization client 150 may be a client device having network analysis applications, such as the visualization interface 152, that consumes the analytical data processed by analyzer 140. As an example, the visualization device 150 can be a desktop, a laptop, or a mobile device such as a smart phone, a tablet, or any other portable computing device that can be used by a network administrator for monitoring a network, such as LAN 101. In some instances, the visualization client 150 and the analyzer 140 are communicatively connected via a network (not shown) allowing communication of data between the devices. In the embodiments, the network visualization module 151 includes executable instructions, computer components, or a combination of both that implement a visualization of the network. The visualization, shown in FIG. 1 as output of an visualization interface 152, can include graphical representations of the device groups generated by the interactive clustering module 141.

The visualization interface is illustrated in FIG. 1 as displaying a network graph as a result of the clustering and grouping performed by the analyzer 140, in accordance with the embodiments. The network graph can be a visual representation of the topology of a network, having visual cues, such as nodes, for identifying client devices, and traffic in a network having devices that utilize the mDNS protocol for resolving host names and IP addresses, according to some embodiments. Nodes can represent various types of network devices, including by not limited to, a client device, a router, an AP, a host server, a database, or any network device in a network architecture as disclosed herein (e.g., client devices 110a-110n). For example, the visualization interface 152 may present a graph which represents client devices 110a-110n on LAN 101 that are measured as having small distances from each other, as determined by the distance algorithm, as a cluster of nodes. Alternatively, the graph displayed within visualization interface 152 can show client devices 110a-110n on LAN 101 that are measured as having large distances from each other, as determined by the distance algorithm, as individual nodes separated by edges (having a length that is commensurate with the calculated distance). Furthermore, as described in greater detail in reference to FIG. 5, the visualization can be generated in an interactive manner. For instance, the visualization interface 152 can receive input from a user (e.g., merge device groups) that adds clusters to the visualization. The visualization client 150 can include an input device, and an output device. Input device may include a mouse, a keyboard, a touchscreen, and the like, that can be utilized by the user to interact with the visualization. An output device of the visualization client 150 may include a display, a touchscreen, a microphone, and the like, which displays a visualization. In some embodiments, input device and output device of the visualization client 150 may be included in the same unit (e.g., a touchscreen).

Figure 2:
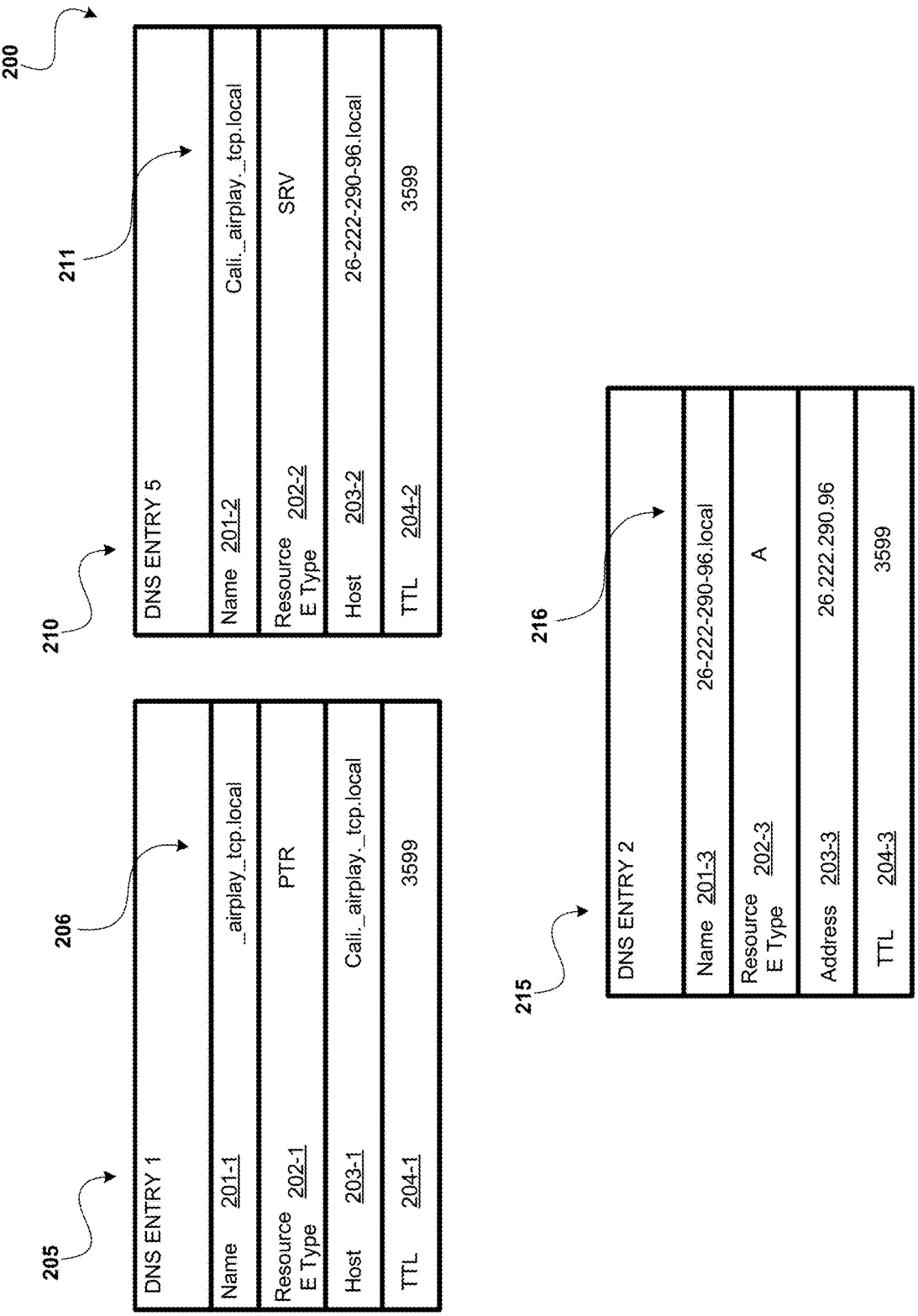
FIG. 2 illustrates examples of domain name services (DNS) entries that can be collected and analyzed by the network device shown in FIG. 1 to identify host associations utilized by the device group techniques (e.g., host name-to-node association for visualization of clustering results), according to some embodiments.
Figure 4:
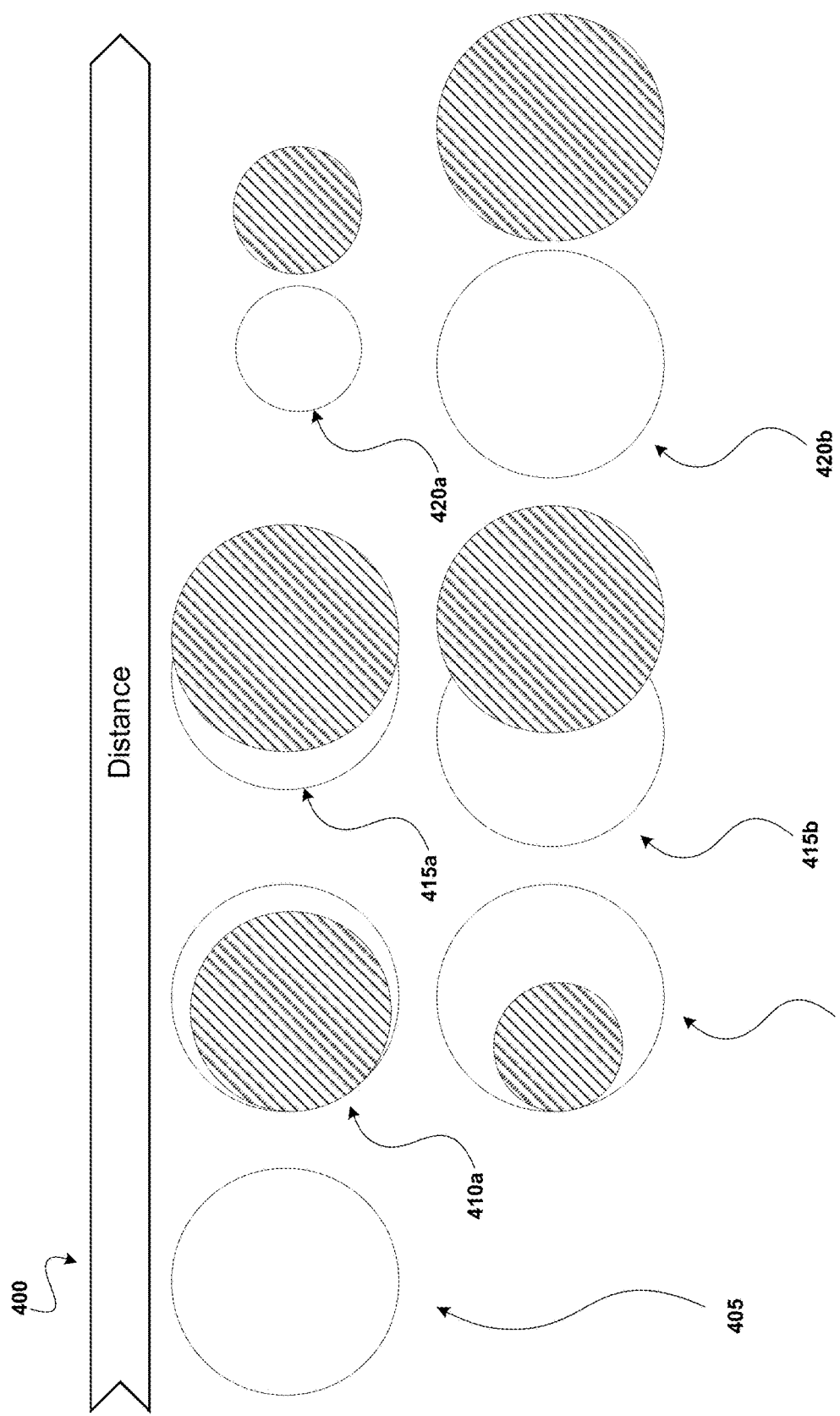
FIG. 4 is a conceptual diagram depicting examples of relationships between distances and similarities between device groups, according to some embodiments.

FIG. 2 illustrates examples of domain name services (DNS) entries 205, 210, and 215 that can be included in discovery traffic and analyzed in accordance with the interactive clustering and device grouping by the analyzer 140 shown in FIG. 1. In some embodiments, the records may communicated in accordance with the mDNS protocol, for instance by a device advertising its services to the network. As seen in FIG. 4, each of the DNS entries 205, 210, and 215 include text, namely the entry parameters 206, 211, and 216, which indicate certain network and capability attributes for a device on the network. The embodiments can leverage text-based analysis of these DNS records 205, 210, and 215, for instance applying NLP techniques to the text of the entry parameters 206, 211, and 216. Examples of NLP techniques applied in the embodiments can include, but are not limited to: simple segmentation of text (e.g., value separated by "equal", such as param=value); character based embeddings (e.g., fastText), where the parameters can be represented with their word embeddings constructed using the method instead of dictionary encoding; and a list of Enterprise Domains, in the case of DNS. As a result of text-based analysis, various properties that can be identified by DNS records, such as common services, common attributes, same resource type, and the like, can be used as a measure of similarity between devices. During analysis, a set of records can be linked based on identified commonalities to generate a graph with nodes and edges that correspond to particular entry parameters.

In the illustrated example of FIG. 2, the set of records 205, 210, and 215 can be described as common host, shown as "Cali", which is advertising a service, shown as "airplay." In some cases, a network architecture may include a DNS server having a cleanup tool and a tf-idf tool configured to operate on traffic at the network edge. The records can be organized in tuples 205, 210, and 215 (hereinafter, collectively referred to as "tuples 200"). Tuples 200 include DNS names 201-1, 201-2, and 201-3 (hereinafter, collectively referred to as "DNS names 201"), a resource type 202-1, 202-2, and 202-3 (hereinafter, collectively referred to as "resources 202"), its associated Host/IP addresses 203-1, 203-2, and 203-3 (hereinafter, collectively referred to as "Host/IP addresses 203") and time to live (TTL) 204-1, 204-2, and 204-3 (hereinafter, collectively referred to as "TTL"). In particular, FIG. 2 illustrates that by inspecting the text of entry parameters of DNS names 201 and DNS Host/IP addresses 203, it can be determined that the service corresponds to "airplay" and the hosts corresponds to "Cali." Accordingly, the disclosed hierarchical distance techniques can use the text based distances between these entry parameters 206, 211, and 216, and other entry parameters contained in other records, in order to measure for similarities. For instance, analyzing DNS entries 205, 210, and 215 and other records that may include text that indicate the common name "airplay" (corresponding to a shared service) can be considered as similar, and viewed as a graph with the name as a node.

Figure 3A:
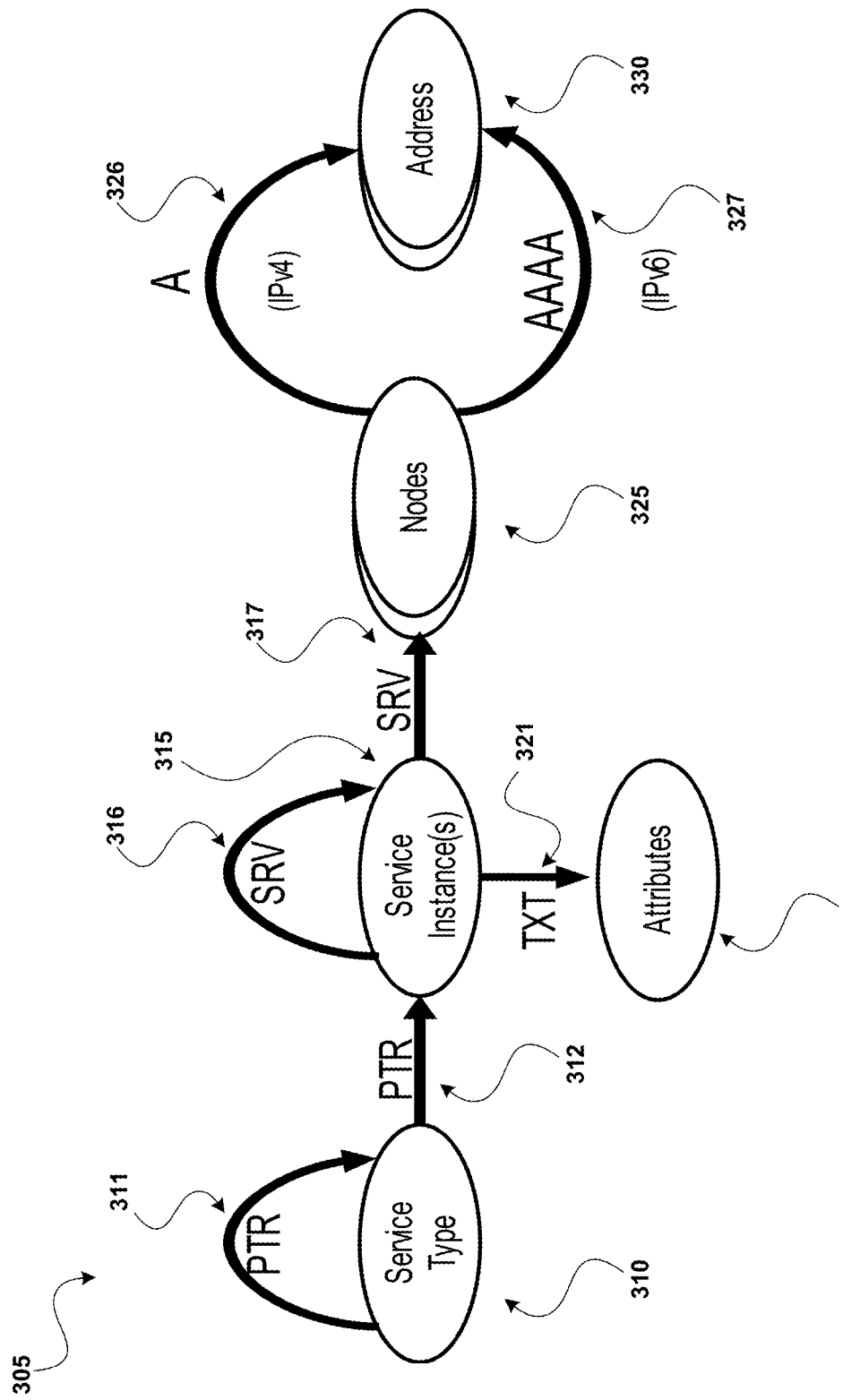
FIG. 3A illustrates an example of mapping of services to network addresses in accordance with a multicast domain name service (mDNS) protocol, according to some embodiments.
Figure 3B:
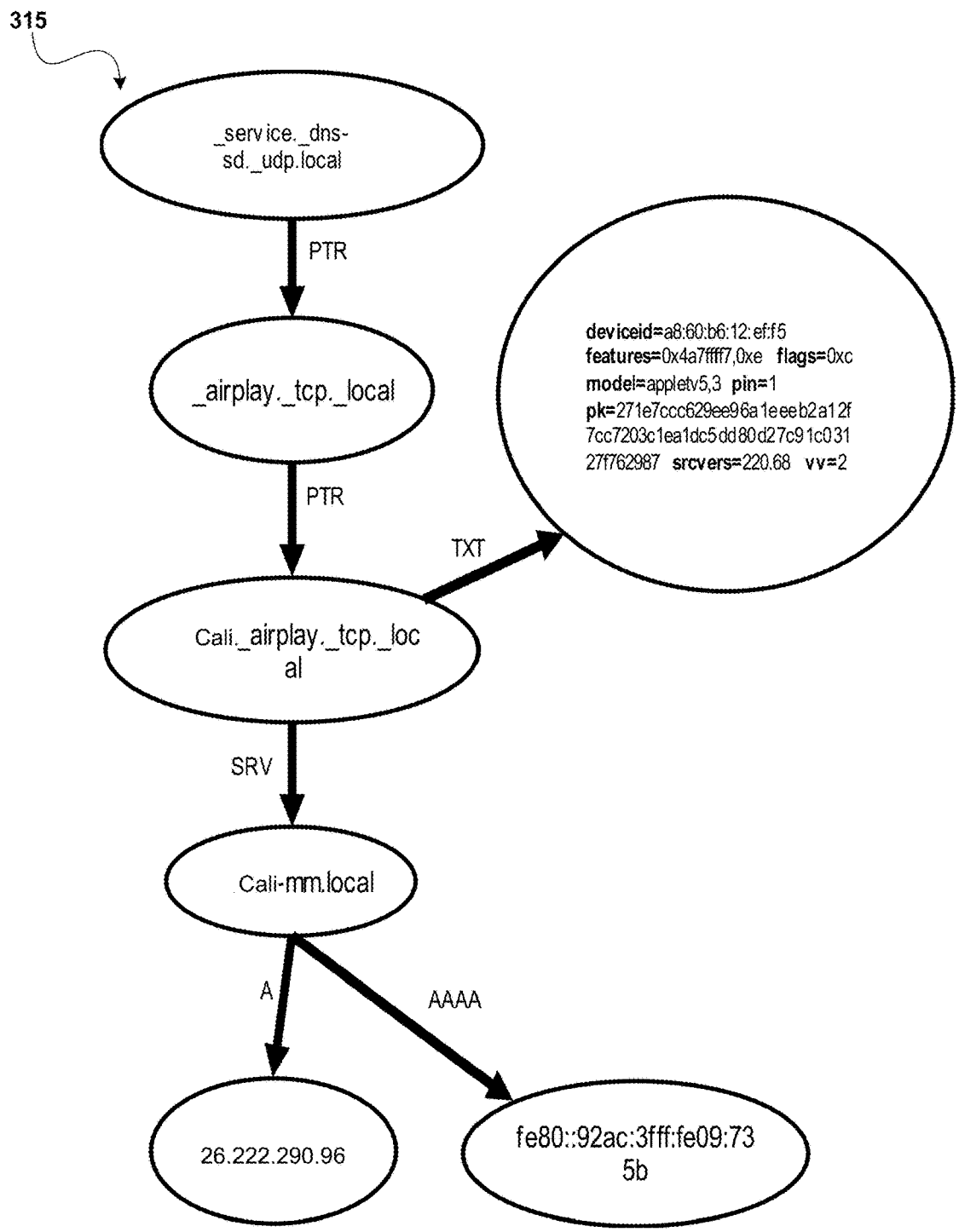
FIG. 3B illustrates a graphical representation of a linked set of records associated with in accordance with a mDNS protocol, according to some embodiments.

FIG. 3A illustrates an example mapping 305 of service 310 to a network address 330 in accordance with a multicast domain name service (mDNS) protocol, according to some embodiments. Mapping 305 may be performed by a mapping tool in a DNS server. For example, the DNS server can be at a location that is close to a tap point and the packet processor in the network (e.g., packet processor 130 shown in FIG. 1). For purposes of discussion, FIG. 3A will be described in relation to FIG. 3B, which illustrates a graphical representation of a linked set of records that can be linked together based on the mapping.

As a general description, mDNS conveys a set of relationships within the advertisement of records. For each node, their advertised services and attributes can be collected as multiple records. Thus, for a single node, a set of associated records for that node would list all of its services and attributes. Also, a record indicating a service instance can be used to link a node to a service and attribute. These relationships, which can be inferred from mDNS based records, are leveraged by the embodiments to further measure similarities between nodes for clustering. Referring now to FIG. 3A, a record can include an advertised service, which is indicated by service type (shown in FIG. 3B as "_airplay_tcp_local"). A pointer record 311 transfers service type 310 to a service instance 321 (shown in FIG. 3B as "Cali._airplay.tcp_local"). A text pointer 321 associates a text record with the attributes 320 of the service (shown in FIG. 3B as "deviceid=a8:60:b6:12:ef:f5; features=0x4a7ffff7,0xe;flags=0xc;model=appletv5,3; pin=1;pk=271 e7ccc629ee96a1eeeb2a12f7cc7203c1ea1dc5dd80d27c91c0 3127f762987;srcvers=220.68;vv=2"). A service record 316 transfers service instance 315 to a node 325 (shown in FIG. 3B as "Cali-mm.local"). The request for IP address 330 from node 325 may use two types of requests, 326 and 327 (hereinafter, collectively referred to as "requests"), or may follow an indirect request through a CNAME. A request 326 may include an IPv4 address record and a request 327 may include an IPv6 address record leading to IP address (shown in FIG. 3B as "26.222.290.270" through IPv4, or "fe80:: 92ac:3fff:fe09:735b" through IPv6). As a result of analyzing the mDNS records, and the relationships conveyed therein, the data can be prepared for further text-based analysis that is performed during interactive clustering. For instance, NLP techniques applied to analyzed records can include: dictionary encoding a service type extracted from a record, tokenizing text records, and dictionary encoding attributes (and attribute values) within their respective name spaces.

Figure 3C:
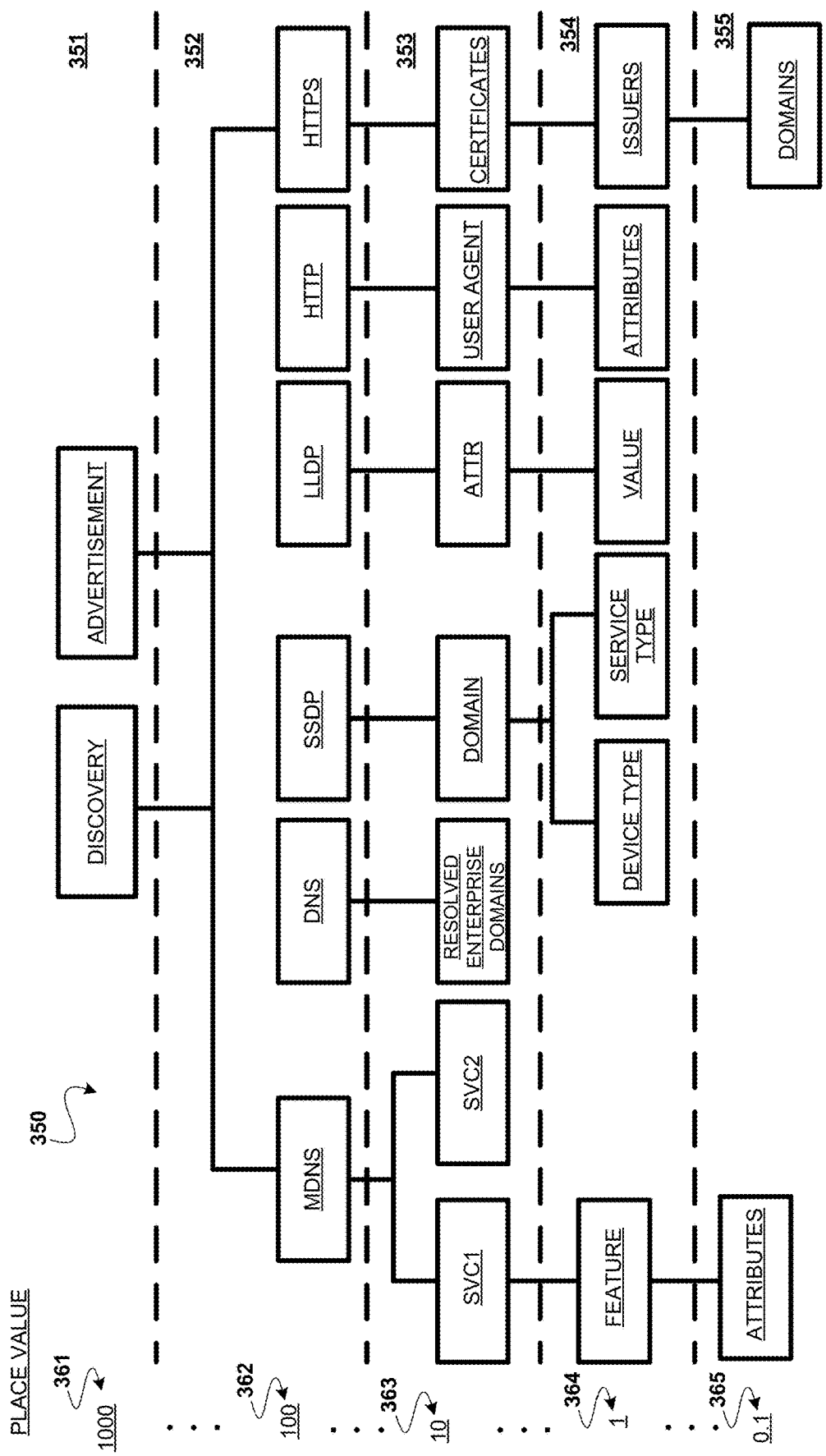
FIG. 3C is a conceptual diagram illustrating examples of the hierarchal distance features as applied for extensibility across multiple protocols, according to some embodiments.

FIG. 3C is a conceptual diagram illustrating examples of the hierarchical distance feature as applied for extensibility across multiple protocol. As alluded to above, the concept of hierarchal distance adds a dimension to text-based analysis that extends beyond flat string distance algorithms. As seen in FIG. 3C, the approach can include setting multiple hierarchical levels illustrated by graph 350, which can be described as generally having a tree structure. In the example, graph 350 includes multiple hierarchal levels that are arranged in a descending order from a first level 351, a second level 352, a third level 353, a fourth level 354, and a fifth level. The levels in the hierarchy can reflect the significance of that level in determining similarities between devices. For example, the first level 351 in the hierarchy may be assigned to properties that are intended to be the greatest indicator that devices are indeed similar. The second level 352 in the hierarchy may be assigned to properties that are slightly lower indicators of similarity, and so on down the hierarchy. Finally, the fifth level in the hierarchy may be assigned to properties that are considered the lowest indicator of similarity.

Also, FIG. 3C shows that each hierarchal level 351-355 can correspond to properties that are recognizable as text, namely parameters of the discovery protocol traffic. Even further, FIG. 3C serves to illustrate that this hierarchy can be applied to different protocols, and their corresponding parameters. That is, the hierarchal distance algorithm can be configured to a level of abstraction that accommodates discovery traffic having a plurality of different protocols. As such, clustering can be achieved by the embodiments whether mDNS, DNS, SSDP, or other protocols are used in the network environment. In some cases, the hierarchal distance algorithm can be configured in a manner that is protocol-specific, where the parameters in the hierarchy specifically correspond to a certain protocol. In accordance with the adaptability features of the system, the number and/or type of protocols that can be analyzed for clustering and device grouping is intended to be dynamically tunable as deemed necessary or appropriate. In the illustrated example, graph 350 shows a hierarchy in which the second hierarchal level 352 is assigned to different protocols. Even further, the lower hierarchal levels 353-355 of the hierarchy include parameters that are conventionally used in each of the protocols of level 352. Due to this hierarchal arrangement, the hierarchal distance algorithm can execute a scheme that is capable of measuring distance for each of the designated protocols. The hierarchy of graph 350 includes a message type "Discovery" and "Advertisement" in the first hierarchal level 351. Protocols are included in the next level of hierarchy, showing "mDNS", "DNS", "SSDP", "LLDP", "HTTP", and "HTTPS" in hierarchal level 352. The descending third level 353 includes: "SVC1" and "SVC" (associated with mDNS); "Resolved Enterprise Domains" (associated with DNS); "Domain" (associated with SSDP); "ATTR" (associated with LLDP); "User Agent" (associated with HTTP); and "Certificates" (associated with HTTPS). The further descending fourth level 354 includes: "Feature" (associated with mDNS); "Device Type" and "Service Type" (associated with SSDP); "Value" (associated with LLDP); "Attributes" (associated with HTTP); and "Issuers" (associated with HTTPS). The last, and fifth level 355 includes: "Attributes (associated with mDNS); and "Domains" (associated with HTTPS). As seen, it is not required for each of the protocols to have parameters that extend to each of the levels of the hierarchy.

Furthermore, it is illustrated that place values 361-365 correspond to the hierarchy in graph 350. For example, each of the place values 361-365 can be assigned to one of the hierarchal levels 351-355, respectively. The example hierarchy in FIG. 3C has a higher place value 361, shown as the thousandths place, that corresponds to the first hierarchal level 351. A comparatively smaller place value 362, shown as the hundredths place, corresponds to the second hierarchal level 352 for the protocols. A place value 363, shown as the tenths place, corresponds to the third hierarchal level 353. A place value 364, shown as the ones place, corresponds to the fourth hierarchal level 354. A place value 365, shown as the 1/tenths place, corresponds to the fifth hierarchal level 355. Thus, each hierarchical level 351-355 corresponds to both a parameter and a place value 361-365 relating to the particular parameter, which serves as a link for subsequently measuring distances based on these parameters. As the levels (top-down) in the hierarchy reflect a decreasing significance of a parameter in determining similarities between devices, each of the place values 361-365 for a lower level also decreases (with respect to the place value at the higher level). In other words, each hierarchal level 351-355 contributes a value, vis-á-vis its place value 361-365 to the distance value that reflects the significance of that level. As an example with respect to the hierarchy in FIG. 3C, devices having a complete overlap in protocols in hierarchal level 352 (e.g., value of 0 in the thousandths place), will contribute a value that has a more significant impact on the total distance, in accordance with the hierarchal distance algorithm, than devices having a complete overlap of attributes in hierarchal level 355 (0 the 1/tenths place). The hierarchy of FIG. 3C is an example for purposes of illustration, and is not intended to limit the scope of the embodiments. The variables relating to the disclosed hierarchical distance aspects are intended to be configurable as deemed necessary or appropriate. In some embodiments, the hierarchy in FIG. 3C can be implemented based on user inputs, such as settings (e.g., GUI shown in FIG. 6D) that are received by the system to configure, and subsequently implement, the hierarchal distance algorithm.

It should be appreciate that all of the protocols and associated parameters are not limited to advertisements. For instance, DNS attributes can be seen in transactions during discovery of internal servers by end-users. While not an advertisement, the communication can be considered to include the text data necessary for the text-based distance measuring techniques disclosed herein. Additionally, the hierarchal approach can be extended to other protocols that include device attributes or parameters in their headers, such as HTTP and/or HTTPS. In some cases, preparation of the data specific to each application can be done specific to the application itself. For the case of HTTP and HTTPS, the approach can use a filtered set of user-agent, certificates respectively based on the higher level application transported by HTTP and/or HTTPS.

In addition configurable weights based on the application can provide additional flexibility in changing the relative contribution of each application to distances. With collection of data from various networks over a period of time with enough labels for device types, all these configurability can be trained through a neural net making it extensible even further.

In some cases, the hierarchal aspects can be extended to scenarios involving devices searching for services (e.g., the discovery of services by consumers). In this case, the hierarchy can be configured to assign a hierarchal level for measuring a similarity regarding a number of resource advertisements and discovery is attributed to the device.

FIG. 4 is a graph 400 depicting calculated distances in relation to similarities between groups of devices. As previously described, the hierarchal distance algorithm is configured to calculate a distance between two devices, by measuring similarities (or dissimilarities) based on various properties related to the devices, such as common services, common attributes, same resource type, and the like. Thus, the calculated distance reflects this similarity (or dissimilarity), which is further utilized by the clustering approach to form device groups. The graphical representation 400 serves to illustrate this relationship between the calculated distance and a degree of similarity that can be used for clustering. The graphical representation 400 can be described as multiple Venn Diagrams including circles representing a set, or group of devices. The common elements of the sets being represented by the areas of overlap among the circles, where the overlap can represent a degree of similarity. FIG. 4 illustrates that a calculated distance can have an inversely proportional relationship to similarity, as the degrees of similarity between sets in each of the Venn Diagrams steadily decreases, as the distance value increases (indicated by the arrow from left to right).

Referring now to diagram 405 in FIG. 4, the relationship between a small distance and its associated similarity between sets are shown. For example, a distance value that is approximately zero may reflect a high degree of similarity. This is shown in diagram 405 as there is a complete overlapping of the two sets (or subsets) of devices. Thus, diagram 405 appears as one circle, as the two sets share all common features. Furthermore, as the sets are the same size (e.g., same number of devices), there is substantially no symmetric difference (e.g., negligible difference outside of the area of overlap). The scenario represented by diagram 405 can be considered as one device in some clustering implementations.

Diagram 410a represents a relationship between a slightly larger calculated distance (with respect to the distance for diagram 405) and the associated degree of similarity. As seen, set 411a (shaded circle) is of a smaller size than set 412a. Although the circular area of set 411a is completely contained within set 412a, there is some difference between the sets, which is the area of 412a that is outside of its partial overlap with 411a. In this scenario, set 411a can be described as a subset of set 412a. This can indicate there are some features of a device (e.g., set 412a) that are not present the compared device (e.g., set 411a), as opposed to being different. Diagram 410b illustrates a similar scenario, however there is a greater difference between the sizes of sets 411b (shaded circle) and 412b. The size of set 411b is smaller as compared to 411a in diagram 410a. Consequently, set 412b has a larger area that exists outside of its overlap with 412b. There is some dissimilarity between the sets 411a, 412a and 411b, 412b, thereby illustrating that there is a smaller degree of similarity represented in diagrams 410a, 410b (distance is substantially small) than in diagram 405 (distance approximately 0) as the distance value has increased.

Diagram 415a represents a relationship between a substantially large calculated distance, and the associated degree of similarity. Diagram 415a shows a set 416a (shaded circle), having a primarily same size as set 417a. Again, there is partial overlap between the sets 416a and 417a. Set 416a and set 417a primarily overlap with each other, indicating that there is a high degree of similarity. However, there is a portion of set 416a that is outside of the area of overlap, and portion of set 417a that is outside of the area of overlap. Restated, both set 416a and set 417a have some dissimilarities with respect to each other (as opposed to being a subset). Now referring to diagram 415b, a scenario that is similar to 415a is illustrated. But, in diagram 415b, there is a greater symmetric difference between set 416b (shaded circle) and 417b, as compared to diagram 415a. Specifically, the area of overlap in 415b is smaller than the areas that are not common in the independent sets 416b and 417b. Diagram 415b represents a case where there is more dissimilarity than similarity present between the devices. Therefore, diagrams 415a and 415b illustrate an even smaller degree of similarity, as it related to a distance value has increased. In some cases, clustering can involve adding weights that can reflect a ratio between the area of overlap versus the area of non-overlap. For instance, in reference to diagrams 415a and 415b, there may be a larger weight added to similarity in the scenario of diagram 415a, as there is a more overlap than difference present. In some cases, the sizes of the set are also weighted in determining similarity for clustering.

Diagram 420a can be generally described as the of converse of diagram 405. Here, the distance value is the largest shown in the graph 400. Such a large distance can indicate that there is substantially no similarity that can be measured between the device, namely the devices have no common features. This relationship is illustrated in diagram 420a as sets 421a and 422a are completely disjointed, having no area of overlap. Also, diagram 420b illustrates disjointed sets 421b and 422b. Nonetheless, the sizes of sets 421b, 422b in diagram 420b are larger than the sizes of the sets 421a, 422a in diagram 420a. As a result of weighting the set sizes, diagram 420b may be considered to show less similarity between its sets 421b, 422b than diagram 420a. For instance, a disjointed set with 20 elements has a higher degree of dissimilarity than a disjointed set of only two elements. It should be understood that various other weights, parameters, and factors not described in reference to FIG. 4 may be implemented by the embodiments for generating clusters. Furthermore, while maintaining the similarity measure with reference to the overlaps, the actual measure of the distance could be modified from using a simple encoded set comparison to embedding based measure or other NLP techniques like Latent Dirichlet Allocation (LDA). With respect to LDA, the extracted topic across various hierarchies could itself provide enough information about the network. For example, similar servers resolved through DNS elicits departmental workflow, the topic measure for mDNS could be the service proxies in the network, and for HTTP it could be the device types identifiers like iPad, iPod or type of android devices.

Figure 5:
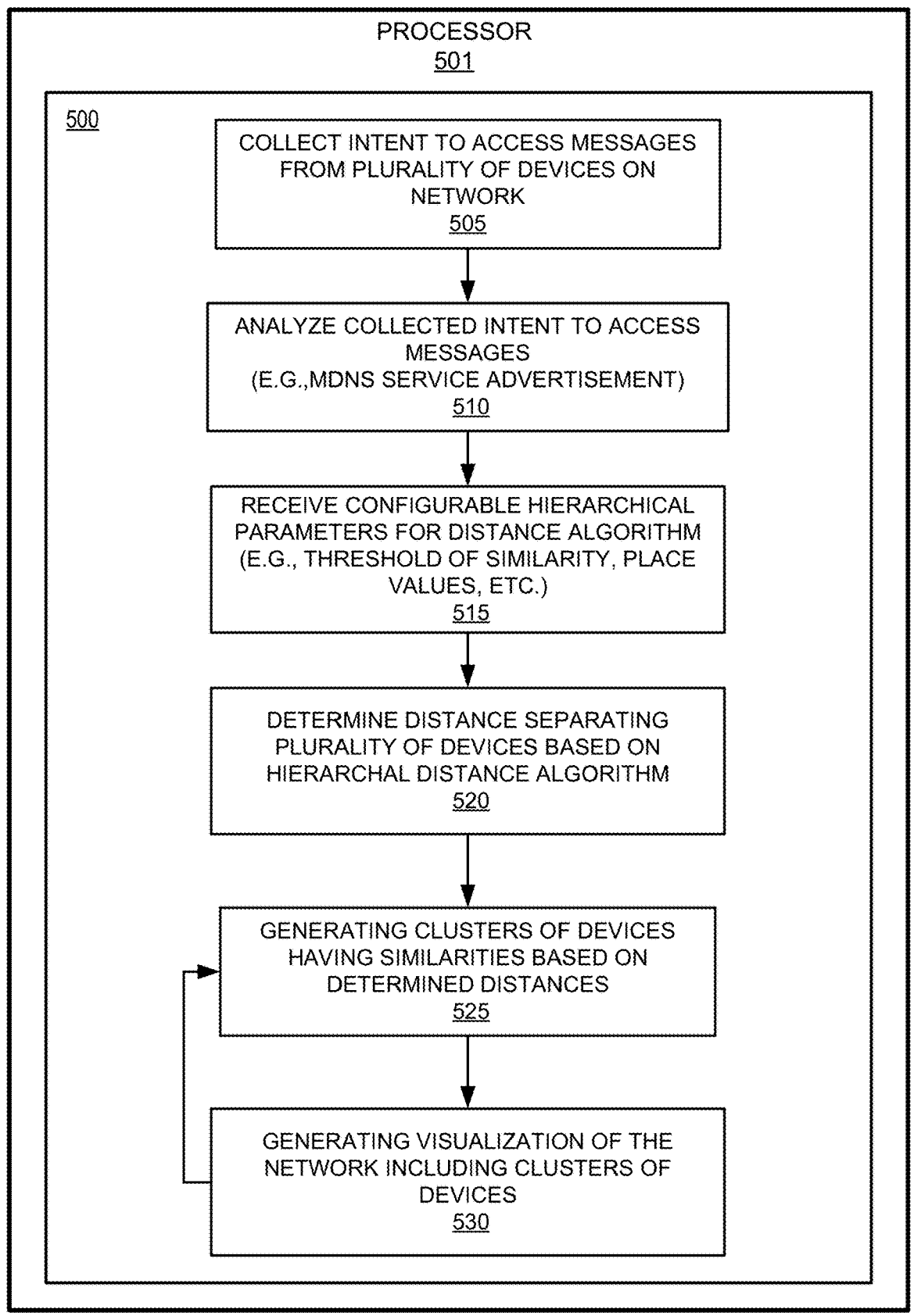
FIG. 5 is an operation flow diagram illustrating an example of a process for executing device grouping with interactive clustering using hierarchical distance, according to some embodiments.

FIG. 5 is an operation flow diagram illustrating an example of a process 500 for executing device grouping with interactive clustering using hierarchical distance, according to some embodiments. Process 500 is illustrated as a series of executable operations performed by processor 501, which can be the analyzer (shown in FIG. 1), as described above. Processor 501 executes the operations of process 500, thereby implementing the disclosed interactive clustering and device grouping techniques described herein.

In an operation 505, a plurality of ITA messages (or service advertisement messages) that are being communicated by a plurality devices on a network can be collected. As previously described, ITA messages can be communicated during device discovery and/or advertisement, and collected in a manner that is passive (e.g., listening, intercepting). In some embodiments, the ITA messages are formatted in accordance with the mDNS discovery protocol. However, it should be appreciated that the embodiments can be configured such that the interactive clustering approach is applicable to various other discovery protocols, such as DNS, SSDP, LLDP, HTTP, HTTPS, and the like. In some instances, ITA messages may be considered consumer messages. For example, in the case of a device that is a consumer of a particular service. Here, a consumer can use the parameters of the consumer messages to evaluate interoperability, and connection methods with other devices on the network, so as to be able to utilize the service.

Next, at an operation 510, the collected ITA messages are analyzed using various text-based analysis techniques. ITA messages can include text, or records (as shown in FIG. 2), that convey discovery parameters that are specific to the particular protocol of the ITA message. Furthermore, the discovery parameters can be used to communicate the capabilities of the device. For instance, in the case of mDNS, a message can include text that indicates a service, attributes, and attribute values related to a certain device. Alternatively, in the case HTTP, the parameters can include text that indicates a user agent, and attributes. It should be appreciated that which parameters are analyzed in operation 510 can be a user configurable feature that can be tailored for the network environment. As an example, a system administrator can designate that the system can examine ITA messages to extract (and subsequently analyze) text for domain, device type, and service type parameters, when the network is known to primarily utilize SSDP, for instance. Alternatively, the discovery protocols and discovery parameters that are analyzed in the process 500 can be automatically determine by the system, in a manner that does not require user input. Accordingly, based on the particular discovery protocol, operation 510 can involve extracting text that corresponds to certain discovery parameters that are specific to the protocol. In some embodiments, operation 510 can include analyzing parameters of ITA messages in a generic manner (e.g., protocol independent), that can be easily applied across different discovery protocols.

In some embodiments, operation 510 involves NLP aspects that can remove biases that may be inherent in text-based analysis, thereby improving in measuring degrees of similarities between devices. For example, text extracted from the ITA messages can be dictionary encoded for each of the respective discovery parameters. Therefore, biases associated with a length of a string for the text may be negligible for the purposes of measuring a degree of similarity between devices. For example, text for each of the identified protocols, attributes, and attribute values can be separately encoded, in manner that allows commonalities in their respective text to be treated similarly (as a single entity) irrespective of the length. In some embodiments, a cardinality threshold can be used to decide whether text for a discovery parameter is dictionary encoded. In some instances, the embodiments apply a cardinality threshold, and text with high cardinality, such as encrypted values and text strings having the same length, are not encoded. Conversely, text with lower cardinality, with respect to the cardinality threshold, are encoded.

Furthermore, NLP techniques in operation 510 can address keys that may be included in text. Some records use pre-shared keys ("pk") to communicate a security code. For instance, a projecting device can communicate a security code, via a key, to verify its proximity to an device that has advertise an "Airplay" service. Given the large length of the string and temporal volatility (e.g., keys change often) associated with keys, as compared to other parameters, measuring a distances between two keys using text-based distance may result in an unproportionable measure of dissimilarity. Using text-based distance, the same device communicating two different keys has a potential of being measured at the same distance as two separate devices due to the bias. NLP can employ an approach that splits the text for other parameters, such as attributes, from text that particularly corresponding to keys. Thereafter, the comparisons between the keys can be performed separately from the remaining text. In some cases, keys are compared first. Then, when keys are found to overlap, a comparison of the other parameters are performed. This key approach can be done on the per-service level, for example, for a common set of services that may be identified by the analysis.

Thereafter, at operation 515, configurable hierarchal parameters for the distance algorithm may be received. A hierarchal approach, as alluded above, is used to designate which discovery parameters (extract from ITA messages) are considered to be greater indicators of similarities between devices. As part of the hierarchal approach, a particular parameter at a higher level in the hierarchy is more indicative of similarity, and thus has a heavier (or weighted) contribution in calculating the distance value. In some instances, the hierarchy implemented by the system can be tuned, or otherwise configured, by a user, thereby providing greater flexibility of the clustering. In an embodiment that may be based on an mDNS environment, operation 515 can include receiving a first hierarchal level corresponding to services, receiving a second hierarchal configurable level corresponding to attributes, and a third configurable hierarchal level corresponding to attribute values. Accordingly, in this case, services can be considered the highest level in the hierarchy, or the most significant property for determining similarities.

In other embodiments, for instance implementations that are extended to multiple different discovery protocols, a hierarchal level can be assigned to protocols. Even further, a number of hierarchal levels that are used, can also be a configurable parameter of the system. For instance, a hierarchal distance algorithm can be set to consider three levels, and then adjusted to use five levels in a hierarchy. Accordingly, ITA messages of the same discovery protocol can be a measure of similarity. In some cases, a hierarchal level can even be assigned to type of message. The system can have the capability to automatically set the abovementioned hierarchal levels itself, based on a known discovery protocol that may be primarily used in the network environment. In other embodiments, a user, such as a network administrator, can provide user input to the system (e.g., GUI shown in FIG. 6D) that assigns the hierarchal levels to particular discovery parameters. The parameters, protocols, and messages that are described above as aspect of the hierarchal approach should not be considered exhaustive. It should be appreciated that other text-identifiable characteristics related to network traffic can be used to form a hierarchy used by the hierarchal distance algorithm.

Furthermore, configurable parameters of the distance algorithm can include place values. Operation 515 can involve receiving a specified place value that corresponds to the each of the abovementioned hierarchal levels. As a general description, the place values increase in an ascending order, as the hierarchal levels increase. Thus, each place value contributes a value to the total distance that is consistent with the hierarchal level's significance in indicating similarity. As an example, the first (e.g., most significant for determining similarity) hierarchal level, which corresponds to service in the mDNS based embodiment, can be set to an order of 10s power to a first decimal place value, such as 1000. A second (e.g., less significant in determining similarity) hierarchal level, which corresponds to attribute in the mDNS based embodiment, can be set to a descending order of 100s power to a second decimal place, such as 1. A third (e.g., lest significant in determining similarity) hierarchal level, which corresponds to attribute values in the mDNS based embodiment, can be set to a further descending order of 10s power to a third decimal place, such as 10.

Additionally, operation 515 can include receiving a threshold of similarity. The threshold of similarity can be a level that must be met (or exceeded) to satisfy a degree necessary for devices to qualify as similar for the intended purposes of clustering. For example, a user can input a value for the threshold of similarity at operation 515. A distance value calculated between two devices can be compared to the threshold of similarity, as entered, and used to determine whether the devices have a degree of similarity to be clustered together. Thus, as alluded to above, clustering can be tuned as deemed optimal for the particular application, based on the threshold of similarity. In some cases, the threshold of similarity is a variable that can be configured based on various factors related to the devices or the clustering, such as services advertised by the devices, or the visualization technique.

Subsequently, at operation 520, a distance separating each of the plurality of devices according to a calculated distance value is determined. In the embodiments, the disclosed hierarchal distance algorithm is implemented at operation 520. As alluded to above, the hierarchal distance algorithm leverages text-based properties, and incorporates a hierarchal scheme, in order to measure distance between devices on a network. Calculating a distance between two devices, for example, can involve generating a distance value for each of the hierarchal levels used by the algorithm. Restated, a degree of similarity for each level in the hierarchy can be determined, by applying text-based measurements to the parameters within each of the hierarchal levels.

Then, each distance value at the respective hierarchal level, is placed in its assigned place value for a total composite of distance. The total, comprised of each of the distance values at each hierarchal level, is considered the distance between the two devices. In some cases, the distance value at each hierarchal level is a value between 0 and 1, with a distance of 1 being the largest disjoint set, and 0 being complete overlap (e.g., same device). As an example, a distance value at the hierarchal level for service can be 0.3, a distance value for the hierarchal level for attribute can be 0.1, and a distance value at the hierarchal level for attribute value can be 0.2. Placing each of the aforementioned distance values at the respective place value assigned to the hierarchal level, results in the total distance 3120 between the two device.

At an operation 525, the process 500 can generate clusters of similar devices based on the determined distance. Each of the clusters can comprise a subset of devices having small distances between them, as calculated by the hierarchical distance algorithm. Thus, devices that are clustered together serve as an indication that the devices possess similarities of some form. In some embodiments, operation 525 can involve employing a clustering approach, that can be used to group clusters flexibly. The clustering approach can generate two merged clusters with the distance determined in operation 520 between them. In some cases, the clustering approach can also provide a total number of devices among the two groups. This can be used to generate the clusters, in an iterative manner. At each iteration, there can be an decision on whether to the groups are clustered. Also, based on the number of devices in the merged group, it can be further determined whether to merge leaf nodes (e.g., base data) or aggregate clusters.

In some embodiment, the clustering approach implemented at operation 525 may begin with forming basic cluster groups, which include the same devices, or perfect overlaps as discussed in greater detail in reference to FIG. 4. In other words, the basic cluster group are formed by devices with zero distance between them. Then, similar devices with minimal distances can be merged within a threshold, depending on the final number of groups formed. This threshold can be used to form other heterogenous clusters to generate an initial set of clusters that are easy to visualize. Additional clusters can be formed by a combination of configuration and visualization, similar to a feedback loop. For instance, the initial set of clusters can be generated at half of the height of a linkage tree. Recursive visualization models could be used to zoom in, and view sub-clusters or leaf nodes to determine merge decisions, thus making for an interactive approach in determining groups.

In some embodiments, K-Means approach is utilized for clustering. K-Means approach can be generally described as where each device is assigned to a cluster randomly and an iterative best effort is employed to regroup them among the existing clusters. In this K-Means approach, it is typically expected to see some number of large clusters and a very long tail of devices that would form a cluster of ungroupable devices. Distribution of such devices in the clusters remain separately with a bottoms-up clustering model as described in this embodiment, compared to being sprinkled around various clusters in a top-down approach. The approach described provides a better user-experience in all compared to competitive approaches.

Subsequently, at an operation 530, a visualization of the network including clusters of devices therein can be generated. The visualizations can be displayed to a user, for instance within a interface (e.g., visualization interface shown in FIG. 1) on a display device of a computer device. Visualizations can be displayed having various graph topologies, that can convey the clustering and distance results to a user in an intelligible and visually discernable way. Thus, the visualization aspects can enhance the user experience, as well as improve the ease of use. As previously described, the visualization can be presented to the user in an interactive manner. User interactions with the visualization can allow the user to provide input that impacts the clusters that are rendered in the visualization. For instance, as described in operation 525, interactions with the visualization can cause additional clusters to be formed. Various examples of visualizations that may be presented to a user, in accordance with the embodiments, are depicted in FIGS. 6A-6C.

Figure 6B:
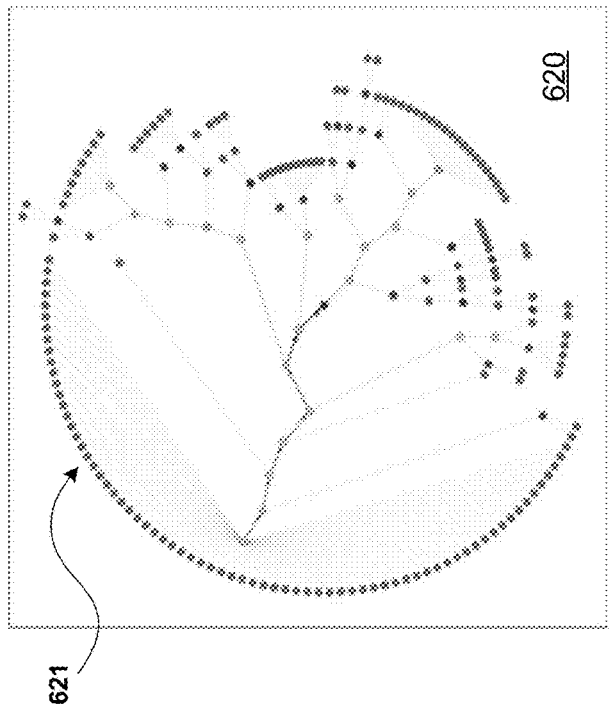
FIGS. 6A-6C depict examples of network graphs generated using visualization aspects of the device grouping system disclosed herein, according to some embodiments.
Figure 6A:
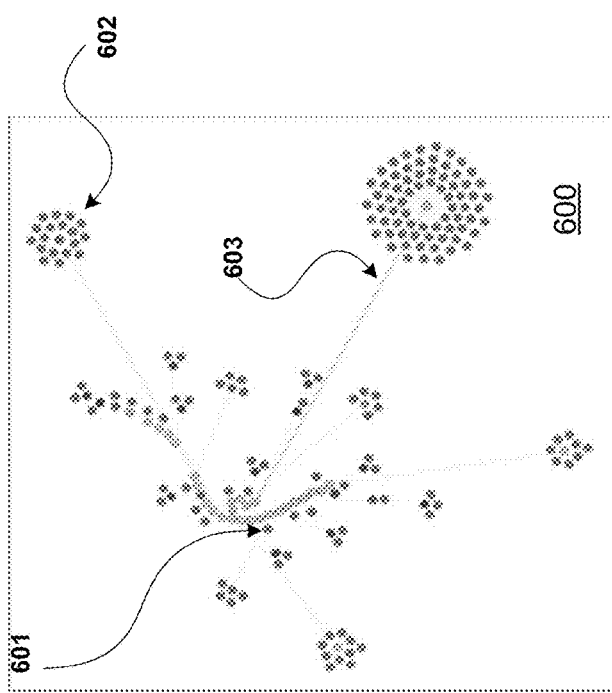
Figure 6C:
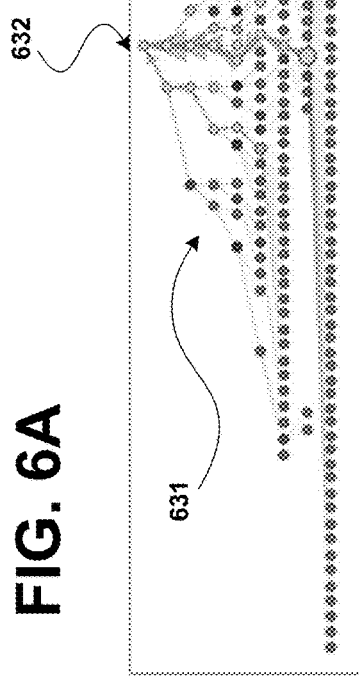

Now referring to FIGS. 6A-6C, examples of visualizations that can be generated as a result of the hierarchal distance techniques are shown. FIG. 6A illustrates an example of a visualization 600 the shows individual devices 601 and clusters 602 as close to each other. Visualization also displays arrows 603 that indicate the direction of aggregation. FIG. 6B shows another example of a visualization 620. The visualization 620 places devices at the periphery of a circle 621 with center being the groups with all of the device as a group. In the example of FIG. 6B, the radius determined the height of the tree. In yet another example of a visualization 630, FIG. 6C the groupings as a tree 631. As seen, the tree has a top 632. The top 632 of the tree 631 can be a group with all of the devices on a network included therein.

Figure 6D:
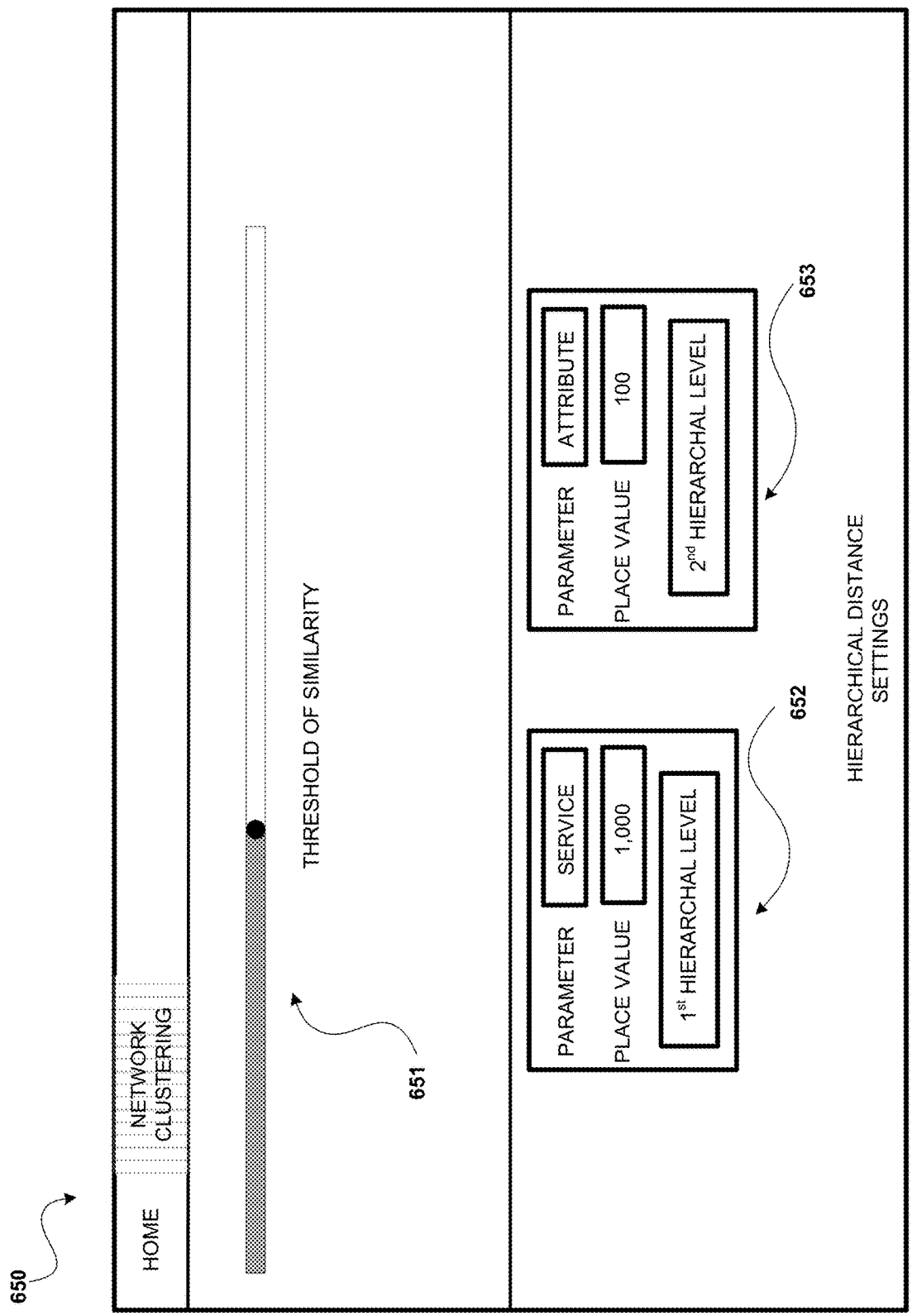
FIG. 6D depicts an example of a user interface for configuring the interactive clustering using hierarchal distance features disclosed herein for adaptability and extensibility to multiple protocols, according to some embodiments.

FIG. 6D illustrates an example of a GUI 650 that can implemented for receiving user-configurable settings for the hierarchal distance algorithm (and the clustering approach). The GUI 650 may be implemented as an element of the visualization interface (shown in FIG. 1), in some instances. As discussed above in reference to FIG. 5, discovery paraments can be assigned to a hierarchal level as a configurable feature. Accordingly, as seen in FIG. 6D, the GUI 650 can include a window 652 for selecting which parameter is being assigned to a first hierarchal level. In the example, a user has selected "service" as the parameter corresponding to the first hierarchal level. Also, a second window 653 shows "attribute" selected as the parameter that corresponds to the second hierarchal level. Furthermore, the window 652 includes an input for a place value to be assigned to the first hierarchal level. In the example, the first hierarchal level is set to the thousandths place. Similarly, a place value assigned to the second hierarchal value is set in window 653. The second hierarchal level is set to the hundredths place.

The hierarchal distance settings can be received from the user, by interacting with the respective window 652, 653 (or other elements) using a form of input deemed appropriate, such as keyboard entry, pull down menu, radio button, and the like. By entering the particular settings shown in FIG. 6D, the hierarchal distance algorithm, in this case, has configured by the user to consider service as the predominant property in measuring similarities. Furthermore, any distance value that is measured based on common services will be placed set in the thousandths place in the total distance. Additionally, attributes has been selected as a less significant property in measuring similarities. Distance values that are measured based on common attributes will be set in the hundredths place in the total distance. In some cases, the number of hierarchal levels can be configured, which may result in additional windows being displayed to receive the corresponding settings. Additionally, settings that are related to extending the embodiments to multiple discovery protocols may be used. For example, the GUI 650 can include an input mechanism for entering one or more protocols that may be applicable.

Also, FIG. 6D shows a setting for the threshold of similarity. FIG. 6D shows the threshold of similarity as a sliding bar input. This serves to illustrate that the GUI 650 is particularly designed for a user to easily configure the clustering an hierarchal distance functions. That is, the GUI 650 allows a user to enter settings via simple input mechanisms, which do not require complicated user interactions or a deep knowledge of the algorithms applied. Having a general understanding of the hierarchy approach and some knowledge of the network environment, a user can, by in large, appropriately configure the system as desired. In an embodiment, some of the configurable settings can be automatically populated, or allows the user to select from a group of provided settings, as a smart feature that further simplifies configuring the system. It should be appreciated that the examples of hierarchical distance settings shown in FIG. 6D are not meant to be exhaustive, and can include for other configurable features of the techniques disclosed herein. Moreover, in some embodiments, the configurable settings may be automatically set by the system either in whole or in part.

Figure 7:
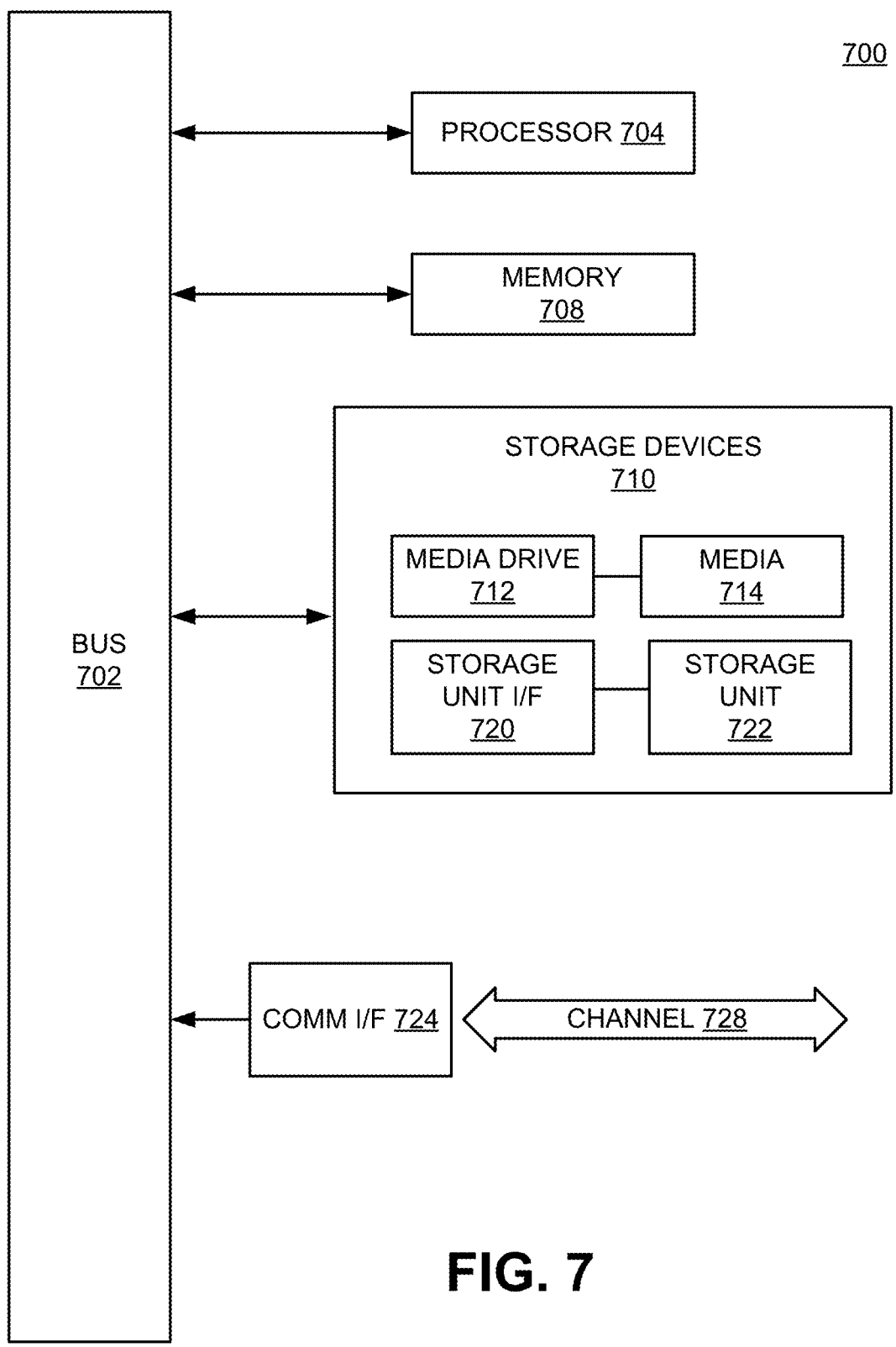
FIG. 7 illustrates an example computing device that may be used in implementing various device grouping with interactive clustering using hierarchical distance features relating to the embodiments of the disclosed technology.

FIG. 7 depicts a block diagram of an example computer system 700 in which may be used in implementing various device grouping with interactive clustering using hierarchical distance features relating to the embodiments of the disclosed technology. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 708, such as a random-access memory (RAM), cache and/or other dynamic storage devices, coupled to bus 702 for storing information and instructions to be executed by processor 704. Main memory 708 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes storage devices 710 such as a read only memory (ROM) or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 708. Such instructions may be read into main memory 708 from another storage medium, such as storage device 710. Execution of the sequences of instructions contained in main memory 708 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 508. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes a communication interface 718 coupled to bus 702. Network interface 718 provides a two-way data communication coupling to one or more network links that are connected to one or more local networks. For example, communication interface 718 may be an integrated service digital network (ISDN) card, cable modem, satellite modem, or a modem to provide a data communication connection to a corresponding type of telephone line. As another example, network interface 718 may be a local area network (LAN) card to provide a data communication connection to a compatible LAN (or WAN component to communicated with a WAN). Wireless links may also be implemented. In any such implementation, network interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world-wide packet data communication network now commonly referred to as the "Internet." Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method for interactively clustering a plurality of devices within a communication network, comprising:
    collecting, by a network device, intent to access messages and service advertisement messages communicated amongst the plurality of devices within the communication network, wherein the intent to access messages and service advertisement messages are formatted in accordance with a discovery protocol;
    analyzing, by the network device, the collected intent to access messages and service advertisement messages to identify services, attributes, and attribute values associated with the plurality of devices using text-based analysis;
    determining, by the network device, a distance separating each the plurality of devices according to an associated distance value, wherein the distance value relates to a degree of similarity between each of the plurality devices based on the identify services, attributes, and attribute values;
    generating, by the network device, clusters of devices based on the determined distances, wherein each cluster of devices comprises a subset of devices from the plurality of devices having low distances separating the devices indicating a high degree of similarity between the subset of the plurality of devices based the distance algorithm; and
    providing, by the network device, data for generating a visualization of the communication network, wherein the visualization comprises graphical representations of the generated clusters of devices and the determined distances separating each the plurality of devices.

2. The method of claim 1, further comprising:
    receiving, by the network device, a first configurable hierarchical level corresponding to services,
    receiving, by the network device, a second configurable hierarchical level corresponding to attributes;
    receiving, by the network device, a third configurable hierarchical level corresponding to attribute values,
    determining, by the network device, similarities between identified services within the first configurable hierarchical level based on the text-based analysis in manner that removes text bias;
    determining, by the network device, similarities between identified attributes within the second configurable hierarchical level based on the text-based analysis in manner that removes text bias;
    determining, by the network device, similarities between identified attribute values within the third configurable hierarchical level based on the text-based analysis in manner that removes text bias;
    measuring, by the network device, a degree of similarity between each of the plurality of devices according to the determined similarities within each of configurable hierarchical levels; and
    calculating, by the network device, a distance value between each of the plurality of devices using the corresponding measured degree of similarity for each of the plurality of devices.

3. The method of claim 2, further comprising:
receiving, by the network device, a place value corresponding to each of the configurable hierarchical levels;
calculating, by the network device, values relating to similarities within each of the configurable hierarchical levels using the assigned place values; and
wherein measuring the degree of similarity between each of the plurality of devices comprises applying a configurable threshold of similarity using the calculated values.

4. The method of claim 3, wherein the first configurable hierarchical level corresponds to an order of 10s power assigned to a first decimal place value for the first configurable hierarchical level, the second configurable hierarchical level corresponds to a descending order of 10s power assigned to a second decimal place value for the second configurable hierarchical level, and the third configurable hierarchical level corresponds to a further descending order of 10s power assigned to a third decimal place value for the third configurable hierarchical level.

5. The method of claim 2, further comprises:
dictionary encoding text associated with each of the identified services, the identified attributes, and the identified attribute values such that a bias associated with the length of a string for the text is negligible in measuring the degree of similarity.

6. The method of claim 2, wherein the discovery protocol comprises multicast Domain Name System (mDNS).

7. The method of claim 6, wherein the calculated value relating to similarities between the services are set to the first decimal place value, the calculated value relating to similarities between the attributes are set to the second decimal place value, and the calculated value relating to similarities between the attribute values are set to the third decimal place value.

8. The method of claim 7, wherein the measured degree of similarity between a pair of devices of the plurality of devices comprises a distance that is the total composite of the distance value set the first place value, the distance value set to the second place value, and the distance value set to the third place value.

9. The method of claim 8, wherein the distance can be weighted based on sizes of datasets used in the analysis, such that the degree of similarity is proportional to the sizes of the datasets.

10. The method of claim 1, wherein the configurable threshold of similarity is a variable that is configurable by a user based on one or more factors relating to the plurality of devices, the service associated with the plurality of devices, and the visualization.

11. A method for interactively clustering a plurality of devices within a communication network, comprising:
collecting, by a network device, advertiser messages and consumer messages communicated amongst the plurality of devices within the communication network, wherein the advertiser messages and consumer messages are formatted in accordance with one of a plurality of protocols;
analyzing, by the network device, the collected advertiser messages and consumer messages to identify protocols, attributes associated with the identified protocols, and attribute values associated with the identified attributes;
determining, by the network device, a distance separating each the plurality of devices using a distance algorithm, the distance algorithm:
assigning, by the network device, configurable hierarchical levels to the identified protocols, the identified attributes, and the identified attribute values;
measuring, by the network device, a degree of similarity between each of the plurality of devices based on determined similarities within each of configurable hierarchical levels; and
calculating, by the network device, a distance value relating to the measured degree of similarity between each of the plurality devices, wherein the calculated distance value between devices corresponds to the determined distance between devices;
generating, by the network device, clusters of devices based on the determined distances, wherein each cluster of devices comprises a subset of devices from the plurality of devices having low distances separating the devices indicating a high degree of similarity between the subset of the plurality of devices based the distance algorithm; and
generating, by the network device, a visualization of the communication network, wherein the visualization comprises graphical representations of the generated clusters of devices and the determined distances separating each the plurality of devices.

12. The method of claim 11, wherein the one of a plurality of protocols comprises: multicast Domain Name System (mDNS), Domain Name System (DNS), Simple Service Discovery Protocol (SSDP), Link Layer Discovery Protocol (LLDP), HyperText Transfer Protocol (HTTP), and HyperText Transfer Protocol Secure (HTTPS).

13. The method of claim 12, further comprising:
receiving, by the network device, one or more protocols via a user interface;
assigning, by the network device, a number configurable hierarchical levels that are specific to the one or more received protocols via a user interface; and
receiving, by the network device, a place value corresponding to each of the configurable hierarchical levels via a user interface.

14. The method of claim 13, wherein the identified protocols, the identified attributes, and the identified attribute values are text extracted from the collected advertiser messages and consumer messages.

15. The method of claim 14, wherein the text associated with each of the identified protocols, the identified attributes, and the identified attribute values are separately encoded such that a bias associated with the length of a string for the text is negligible in measuring the degree of similarity.

16. The method of claim 15, wherein the encoded text that is associated with each of the identified protocols, the identified attributes, and the identified attribute values are separately treated as a single entry in measuring the degree of similarity.

17. The method of claim 16, wherein the determined similarities within each of the configurable hierarchical levels are based on analyzing the encoded text, and comprise: similar protocols from amongst the plurality of protocols; similar attributes from amongst the similar protocols; and similar attribute values from amongst the similar attributes.

18. The method of claim 17, wherein calculating the distance value is based on calculating values relating to the determined similarities within each of assigned hierarchical levels using the assigned place values.

19. The method of claim 11, wherein the visualization of the communication network is interactive such that a user input alters a rending of the clusters of devices.

20. A non-transitory machine-readable storage medium comprising instructions executable by a processor, the instructions programming the processor to:
- collect intent to access messages and service advertisement messages communicated amongst the plurality of devices within the communication network, wherein the intent to access messages and service advertisement messages are formatted in accordance with a discovery protocol;
- analyze the collected intent to access messages and service advertisement messages to identify services, attributes, and attribute values associated with the plurality of devices using text-based analysis, wherein text associated with each of the identified protocols, the identified attributes, and the identified attribute values are separately encoded such that a bias associated with the length of a string for the text is negligible in measuring a degree of similarity;
- determine a distance separating each the plurality of devices according to an associated distance value and a configurable hierarchy, wherein the configurable hierarchy correlates a first level to a first degree of similarity between the identified services associated with the plurality of devices, correlates a second level to a second degree of similarity between the identified attributes associated with the plurality of devices, and correlates a third level to a third degree of similarly between the identified attribute values associated with the plurality of devices;
- generate clusters of devices based on the determined distances, wherein each cluster of devices comprises a subset of devices from the plurality of devices having low distances separating the devices indicating a high degree of similarity between the subset of the plurality of devices based the distance algorithm; and
- generate a visualization of the communication network, wherein the visualization comprises graphical representations of the generated clusters of devices and the determined distances separating each the plurality of devices.

* * * * *